United States Patent
Inada

(10) Patent No.: US 6,986,044 B1
(45) Date of Patent: Jan. 10, 2006

(54) METHOD FOR GROUP UNIT ENCRYPTION/ DECRYPTION, AND METHOD AND APPARATUS FOR WRITING SIGNATURE

(75) Inventor: Ryu Inada, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/386,341

(22) Filed: Aug. 31, 1999

(30) Foreign Application Priority Data

Oct. 14, 1998 (JP) ............................................. 10-291879

(51) Int. Cl.
*H04L 9/00* (2006.01)
*H04K 1/00* (2006.01)

(52) U.S. Cl. ...................... 713/170; 713/153; 713/156; 713/183; 380/30; 380/282

(58) Field of Classification Search ................. 713/153, 713/156, 170, 183, 163; 380/30, 277–282
See application file for complete search history.

(56) References Cited

U.S. PATENT DOCUMENTS

| | | | | |
|---|---|---|---|---|
| 4,200,770 | A | | 4/1980 | Hellman et al. |
| 5,748,736 | A | * | 5/1998 | Mittra .......................... 713/163 |
| 5,852,665 | A | * | 12/1998 | Gressel et al. ................. 380/30 |
| 5,867,578 | A | * | 2/1999 | Brickell et al. .............. 713/156 |
| 5,953,419 | A | * | 9/1999 | Lohstroh et al. ............. 713/165 |
| 6,052,469 | A | * | 4/2000 | Johnson et al. .............. 380/286 |
| 6,118,874 | A | * | 9/2000 | Okamoto et al. ............ 380/282 |
| 6,530,020 | B1 | * | 3/2003 | Aoki ........................... 713/163 |

FOREIGN PATENT DOCUMENTS

| | | |
|---|---|---|
| JP | 4-38029 | 2/1992 |
| JP | 7-134547 | 5/1995 |
| JP | 7-16693 | 6/1995 |
| JP | 7-297818 | 11/1995 |
| JP | 9-291420 | 11/1997 |
| JP | 11-143359 | 5/1999 |

OTHER PUBLICATIONS

D. Bartram, "Prevue Assessment™ Technical Manual", Jun. 1998, pp 1–227.
Careersteps, "Professional Web Resume", reflecting information known at Aug. 30, 1999, pp 1, printed from http://www.careersteps.com.

(Continued)

*Primary Examiner*—Gilberto Baron Jr.
*Assistant Examiner*—A. Nobahar
(74) *Attorney, Agent, or Firm*—Oliff & Berridge, PLC

(57) ABSTRACT

The invention is to provide a group lock which is used in group units for encryption, decryption, and signature. A public key, private key, and common key are provided and the private key is encrypted by use of the common key. The common key is encrypted by use of each public key of the group/member. A group lock which includes the public key, a cryptogram of the private key, and a plurality of cryptograms of the common key is generated. The group/member acquires the group lock and decrypts the cryptograms of the common key by use of the private key of the subject itself to acquire the common key, and decrypts the cryptogram of the private key of the group lock to acquire the private key. The group/member acquires the cryptogram which is encrypted by use of the public key of the group lock sent to the group and decrypts the cryptogram by use of the decrypted private key.

17 Claims, 15 Drawing Sheets

OTHER PUBLICATIONS

Futurestep, "Futurstep: Learn More", pp 1; "Futurestep: Learn More", pp 1–3; "Futurestep: Working with Futurestep", pp 1–3; "Name: Justan X Ample", pp 1–3; "Futurestep: Desired Job Characteristics", pp 1; reflecting information known at Aug. 30, 1999, 11 pages total, printed from http://www. futurestep.com.

Hire.com, "About Hire.com—What We Do" pp 1; "About Hire.com—Frequently Asked Questions for Candidates" pp 1–3; reflecting information known at Aug. 30, 1999, 4 pages total, printed from http://www.hire.com.

Hotjobs, "hotjobs.com—Investors' Overview" reflecting information known at Aug. 30, 1999, pp 1, printed from http://www.hotjobs.com.

Kforce, "kforce.com—Organization Network Services and Pricing", reflecting information known at Aug. 30, 1999, pp 1–6, printed from http://www.kforce.com.

* cited by examiner

FIG. 1 a : TRUST LEVEL OF INDIVIDUAL A
b : TRUST LEVEL OF INDIVIDUAL B

FIG. 2 c : TRUST LEVEL IN TRUST BODY
d : TRUST LEVEL OF THE TRUST BODY IN ANOTHER TRUST BODY

FIG. 5

| $L_{G1}$ | $G_1$ | $L_{I1}$ | $I_1$ |
|---|---|---|---|
| $L_{G2}$ | $G_2$ | $L_{I2}$ | $I_2$ |
| $L_{G3}$ | $G_3$ | $L_{I3}$ | $I_3$ |
| ⋮ | ⋮ | ⋮ | ⋮ |
| $L_{Gi}$ | $G_i$ | $L_{Ii}$ | $I_i$ |
| ⋮ | ⋮ | ⋮ | ⋮ |
| $L_{Gn}$ | $G_n$ | $L_{In}$ | $I_n$ |

$G_i$ : TRUSTED GROUP LOCK
$L_{Gi}$ : LABEL OF GROUP LOCK $G_i$
$I_i$ : TRUSTED INDIVIDUAL PUBLIC KEY
$L_{Ii}$ : LABEL CORRESPONDING TO INDIVIDUAL PUBLIC KEY $I_i$

FIG. 6

| $L_{G1}$ | $G_1$ |
|---|---|
| $L_{G2}$ | $G_2$ |
| $L_{G3}$ | $G_3$ |
| ⋮ | ⋮ |
| $L_{Gi}$ | $G_i$ |
| ⋮ | ⋮ |
| $L_{Gn}$ | $G_n$ |

$G_i$ : GROUP LOCK USED BY PRIVATE KEY
$L_{Gi}$ : LABEL OF GROUP LOCK $G_i$

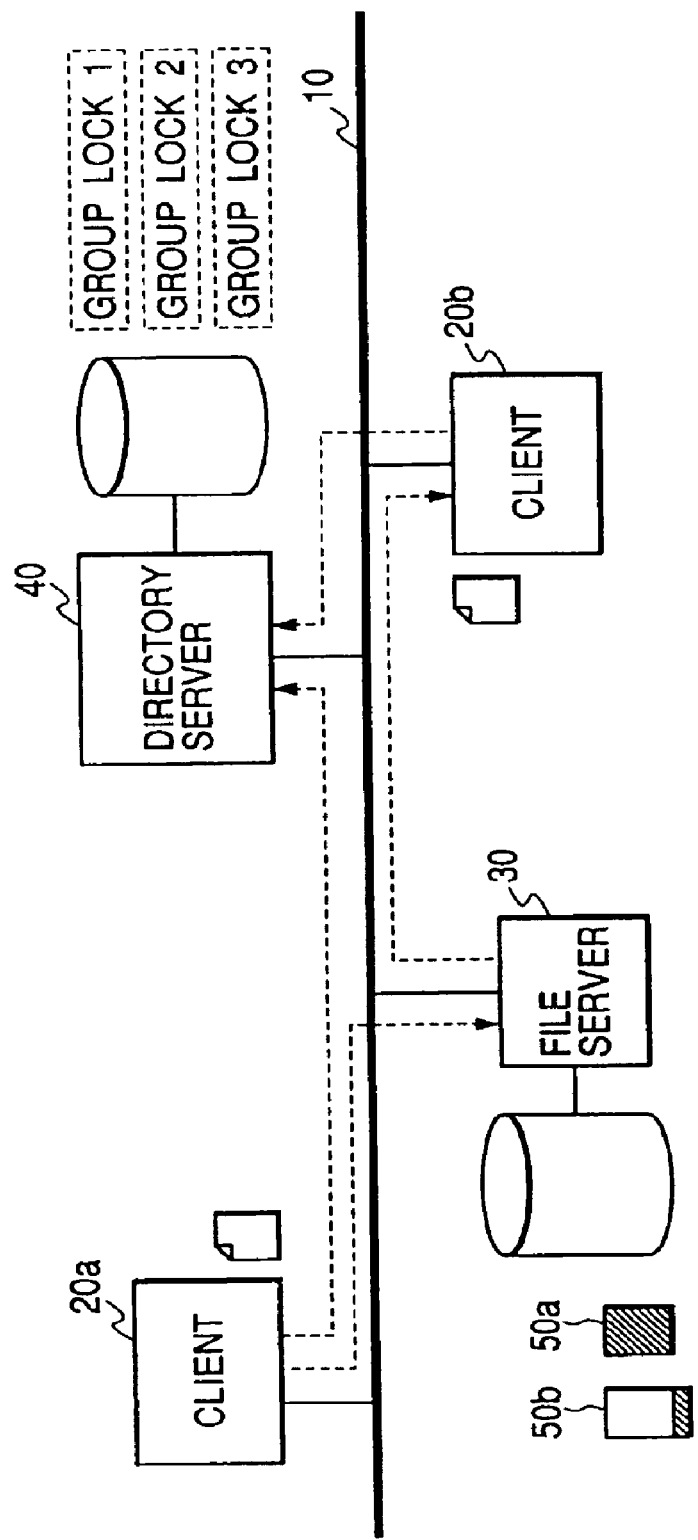

METHOD FOR GROUP UNIT ENCRYPTION/ DECRYPTION, AND METHOD AND APPARATUS FOR WRITING SIGNATURE

BACKGROUND OF THE INVENTION

1. Field of Invention

This invention relates to a public key cryptography technology, and more particularly relates to a system for allowing only an arbitrary member in a group to decrypt and write a signature by use of a group key which is allowed to be used by only the group member.

2. Description of Related Art

Cryptography system called as public key cryptography system is disclosed in U.S. Pat. No. 4,200,770. In the public key cryptography system, a public key is used for encrypting a plain text and a private key is used for decrypting a cryptography text to a plain text. The public key and the private key are different each other. The public key may be disclosed to the public literally to be known by the public. On the other hand, in the conventional cryptography system (referred alternatively to as private key cryptography system, symmetric key cryptography system, and conventional cryptography system), the same key has been used for encryption and decryption, and how to secure the confidentiality has been the most serious problem, however in this public key cryptography system, the confidentiality of an encryption key is needless. In the case that the number of persons who communicates encrypted documents is n, $n \times (n-1) \div 2$ keys are necessary for the conventional encryption-decryption common key system, but only n keys are necessary for the public key cryptography system, this is the advantage of the public key cryptography system. In addition, the public key cryptography system is advantageous in that the same frame can be used in writing the signature of each person, namely encryption processing by each person by use of the private key. For example, a cryptography communication member P having the private key A converts a communication document X by use of the private key A, and sends the converted document Y and the communication document X to another member Q, then the member Q converts the converted document Y by use of the public key B of the member P and can confirm that it is surely the document that is sent by the member P if the conversion result of Y is identical with X. As described herein above, the public key cryptography system is advantageous in several points, which the conventional cryptography system does not have.

Japanese Published Unexamined Patent Application No. Hei 7-297818 discloses the structure of allocation of the public key and the private key to a group. This system is based on the assumption that a group private key is embedded in a physical substance such as a card and a group member is carrying this card consistently. The management of the key is realized based on the physical substance that is the card separated from the everlasting existence namely individual by structuring the cryptography system of the above-mentioned private key and public key using the substance namely the card.

In the public key cryptography system, the everlasting existence such as an individual is set as an independent unit. Therefore, the public key cryptography system cannot function fully in the case that it is necessary to set, for example, a plurality of members other than an individual as a single unit. Further, the system in which a card as described herein above is used is disadvantageous in that a hardware namely a card must be used inevitably, a card itself must be managed, and the verification of a card holder is problematic when the card holder misses the card due to loss or theft, in other word, it is difficult to verify the card holder in due course.

For example, an organization such as a department, a section, and a unit in a company is a cooperative working unit, and also an organization which is independent from hierarchical organizations such as a task force consisting of a plurality of individuals is a cooperative working unit. The confidentiality should be maintained between the inside and the outside of a cooperative working unit, but on the other hand, the information should be common among individual members within the corporation. A cryptography system which allows an arbitrary member of the cooperative working unit to decrypt or write a signature on the common information is required.

Further, in some occasion, a member of the cooperative working unit is required to change, for example, to add or to delete, the information, therefore the cryptography system should be allowable for a member to operate easily for such changing. Further, to take a part of the officer, like a chief of personnel department in a company as in a cooperative working unit, it is required that specific and continuous confidentiality corresponding to the role should be maintained independently of a specific individual who takes a part of the role at some time point in the form which is acceptable of the change of the individual who takes a part of the role.

The present invention provides a cryptography system for solving the above-mentioned problem. It is an object of the present invention to provide a cryptography system in which a public key cryptography system can be used in group units, each of which is a group consisting of components of individuals and groups instead of individual units so that members who belong to a specific group can decrypt the cryptography.

Further it is another objective of the present invention to provide a signature system which enables an arbitrary member who belongs a specific group to write a signature and to verify that a signature on a signed document is the signature written by a member who belongs to the specific group.

SUMMARY OF THE INVENTION

According to the present invention, to achieve the above-mentioned objective, in a method for encryption, a step for storing a public key, an encrypted private key formed by encrypting a private key corresponding to the public key by use of a common key, and lock data which includes a plurality of encrypted common keys generated by encrypting the common key by use of respective public keys of the group/members, and a step for encrypting encryption target data by use of the public key of the lock data are executed.

In this structure, because the lock data includes the encrypting public key, the cryptogram which is formed by encrypting the corresponding private key by use of the common key, and the cryptogram formed by encrypting the above-mentioned common key by use of the public keys of group/members, a group/member can acquire the common key by use of the private key of the member itself and further decrypt it by use of the common key to acquire the private key to be used for decrypting the cryptogram. As described herein above, by encrypting the information by use of the public key of the lock data, it is possible to transmit the information without leakage of the information to the outside of the group/member.

In this structure, the above-mentioned encryption target data is used for decrypting the encrypted information. For example, a decryption cryptography scheme is realized using this decryption key as a common key. In other words, the common key which has been encrypted by means of the public key cryptography system using the lock data, is sent to a group/member, and the group/member decrypts the encrypted common key by use of the lock data. Further, the cryptogram encrypted by use of the common key is decrypted by use of the decrypted common key.

Further, according to the present invention, to achieve the above-mentioned objective, in the method for decrypting a cryptogram, a step for storing a public key, an encrypted private key formed by encrypting a private key corresponding to the public key by use of a common key, and lock data which includes a plurality of encrypted common keys generated by encrypting the common key by use of respective public keys of the group/members; a step for decrypting one of the encrypted common keys included in the lock data by use of the private key corresponding to the group/member to generate the common key; a step for decrypting the encrypted private key included in the lock data, by use of the decrypted common key to generate the private key; and a step for acquiring encryption target data encrypted by use of the public key, and a step for decrypting the encrypted encryption target data by use of the decrypted private key, are executed.

In this structure, a group/member can acquire the private key of the lock data as in the case described above. An arbitrary member can easily decrypt a cryptogram encrypted by use of the public key of the lock data. On the other hand, any one who is not a member cannot decrypt the cryptogram.

Further, according to the present invention, to achieve the above-mentioned objective, in a method for writing a signature, a step for storing a public key, an encrypted private key formed by encrypting a private key corresponding to the public key by use of a common key, and lock data which includes a plurality of encrypted common keys generated by encrypting the common key by use of respective public keys of the group/members; a step for decrypting one of the encrypted common keys included in the lock data by use of the private key corresponding to the group/member to generate the common key, a step for decrypting the encrypted private key included in the lock data by use of the decrypted common key to generate the private key; a step for storing and acquiring signature target data on which a signature to be verified by use of the public key is to be written, and a step for writing a signature on the signature target data by use of the decrypted private key are executed.

In this structure, because only the group/member can acquire the private key corresponding to the public key of the lock data as in the case described above, the data is verified by use of the private key to thereby write a signature of a group/member. A member who acquires the data with a signature can verify the signature by use of the public key of the lock data.

Further, according to the present invention, to achieve the above-mentioned object, in the method for generating lock data, a step for acquiring a pair of a public key and a private key; a step for acquiring a common key; a step for encrypting the private key by use of the common key to generate an encrypted private key; a step for encrypting the common key by use of public keys of respective group/members to generate corresponding encrypted common key; a step for combining the public keys, the encrypted private key; and the encrypted common keys to generate lock data are executed.

In this structure, because the lock data includes the cryptogram of the private key of the lock data encrypted by use of the public keys of the group/members, only the group/member can decrypt a cryptogram and write a signature.

In this structure, the above-mentioned private key is modified by use of a function which is not a one-directional function (including an inverse function), and the modified private key is encrypted by use of the common key for holding.

Further, a function for generating seed may be used when the common key is encrypted by use of the public key of the group/member. In detail, the public key of the group/member is calculated by use of a desired function such as hash function, and the combination of the value of this hash function and the above-mentioned common key (desired calculation, bit catenation) is encrypted by use of the public key of the group/member. Because a different seed for each public key of each group/member is added and the encryption target is varied, no hint is given, even though a plurality of cryptograms are available.

Further in this structure, a group/member may be any one of an individual, a group of individuals, an organization, and a position in an organization.

The above-mentioned lock data may be managed in unit of the above-mentioned lock data. A user can use a plurality of lock data as if the plurality of the lock data were a bundle of locks. The above-mentioned lock data may be stored in a server to which clients can access.

The above-mentioned lock data may be structured so as to include a public key for verifying a signature; an encrypted signature private key which is formed by encrypting a signature private key for writing the signature by use of a public key of a changing right holder; and a signature written by use of the signature private key on desired data included in the lock data.

Further, according to the present invention, in the method for changing lock data, a step for storing lock data including a first public key, an encrypted private key formed by encrypting a private key corresponding to the first public key by use of a common key; a plurality of encrypted common keys formed by encrypting the common key by use of public keys of respective group/members; a second public key for verifying a signature, an encrypted signature private key formed by encrypting a signature private key for writing the signature by use of a public key of a changing right holder, the first public key, the encrypted private key, the encrypted common key, the second public key, and a signature written by use of the signature private key on the encrypted signature private key, a step for decrypting the encrypted signature private key included in the lock data by use of the private key of a changing right holder, a step for changing the lock data, and a step for writing a signature on the changed lock data by use of the signature private key is executed.

In this structure, because only the changing right holder, and the member who generates the lock data, can acquire the signature private key in the case that the signature is successfully verified on the lock data after the change, it is confirmed that the lock data is changed by the changing right holder.

Further in this structure, the step for changing the above-mentioned lock data may be structured so as to include a step for changing the second public key, a step for changing the signature private key, a step for changing the encrypted signature private key before changing by use of a new encrypted signature private key newly formed by encrypting a changed signature private key by use of the public key of a changing right holder, and a step for writing a signature by use of the signature private key after changing. In this case, the changing right holder can set a changing right holder by setting a new signature public key and private key.

The above-mentioned lock data may include a version identifier for indicating the version of the above-mentioned lock data. The above-mentioned lock data may include a precedent version dealing identifier to control how to deal with the lock data of the precedent version based on the identifier. The above-mentioned precedent version dealing identifier may be generated based on the change content of the above-mentioned lock data. Further, the above-mentioned precedent version dealing identifier may include the information for identifying whether the change of the above-mentioned lock data should be applied retroactively or not.

The present invention may be realized as hardware or may be realized at least partially as software. In the case of software, it can be installed in a computer system by way of a communication medium or software package (recording medium).

BRIEF DESCRIPTION OF THE DRAWINGS

FIG. 1 is a diagram for illustrating a calculation rule for determining the trust level of the complex lock.

FIG. 2 is a diagram for illustrating a calculation rule for determining the trust level of others based on the trust level in the trust body and the trust level of the trust body in others.

FIG. 5 is a diagram for illustrating the structure of the public lock list of the present invention.

FIG. 6 is a diagram for illustrating the structure of the private lock list of the present invention.

FIG. 18 is a diagram for illustrating a system to which the present invention is applied.

DETAILED DESCRIPTION OF PREFERRED EMBODIMENTS

Figure 3:
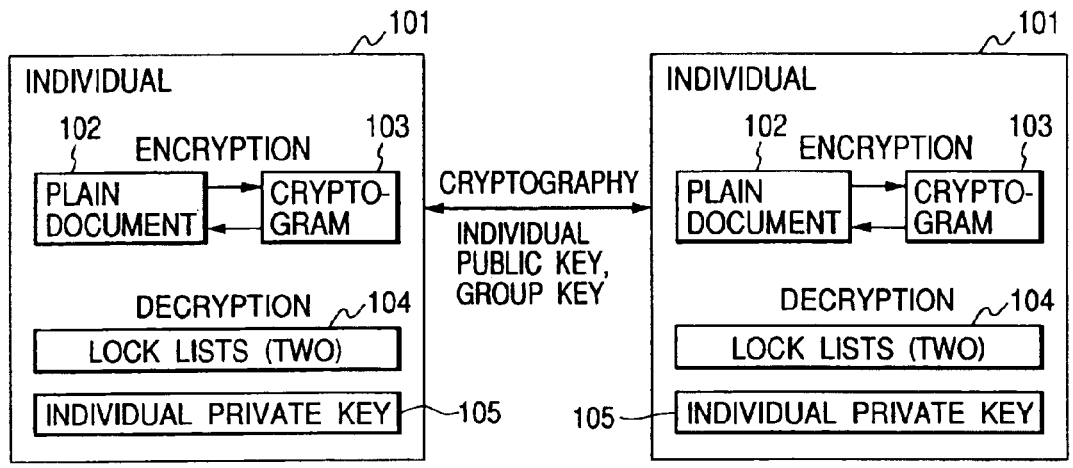
FIG. 3 is a structural diagram for illustrating the outline of the whole cryptography system of the present invention.

First the outline of the present invention will be described. A set of individuals is referred to as a group and an individual namely a member, a component of a group, is referred to as a member hereinafter. The present invention is a public key cryptography system to which the concept of group is introduced. In other words, the present invention is a cryptography system incorporated with main functions including the encryption function, for enabling an arbitrary member who belongs to a specific group to decrypt the cryptography and the signature function for enabling an arbitrary member who belongs to a specific group to write a signature. The present invention is advantageous in that the member who has written the signature is not clarified but only the fact that someone who belongs to the group has written the signature because a signature is written by use of the group private key.

A pair of a private key and a public key corresponding to a group is provided, and these keys are referred to as group private key and group public key respectively. Further, a common key (symmetric cryptography key) for encrypting the group cryptography key is provided. A group private key is encrypted by use of a common key, and the common key is encrypted by use of an individual public key of all the members, thereby forming a set of encrypted common keys. The set of the encrypted common keys and the encrypted group private key are made available at least for the respective members of the group. An arbitrary member who belongs to the group can decrypt the common key which has encrypted by use of the corresponding individual public key by use of the individual private key of the member itself, and further can decrypt the group private key by use of the decrypted common key, in other words can acquire the group private key. As described above, arbitrary information is encrypted by use of the group public key, and then an arbitrary member of the group can decrypt the encrypted information by use of the group private key acquired as described above. Similarly, a member of the group can write a signature by use of the group private key.

The generation of a pair of the group private key and the group public key which are necessary to realize these functions, the generation of the common key, encryption processing by use of the group public key, and processing for changing the member of the group such as adding or deleting of the member, are described below.

To maintain the confidentiality of information by means of encryption of the information, the location of the encrypted information itself is not known, in other words, is not clarified. This concept means that a mechanism for re-encrypting for some reason the information which has been encrypted previously cannot be used. The reason is that it is difficult to specify the location of the information to be re-encrypted because the location is not known. Therefore, when a member who is a group component is changed, the already encrypted information is not re-encrypted, but instead a new key is generated. In the conventional public key cryptography system which is used in individual unit, an individual who is an everlasting existence and the key are in the relation of one-to-one correspondence and renewal of the group key is not necessary, however the renewal of the key is necessary for changing the component of the group because of the correspondent relationship between group and the key.

In the cryptography and signature system of the present invention, an effective function not only in the case of the above-mentioned encryption and writing signature in group units but also in the case that a key, corresponding to a position in an organization such as the chief of personnel department in a company, is provided. For example, there is a key corresponding to the position of the chief of personnel department, when the individual who is engaged in the chief of personnel department is changed, it is possible to accommodate the change in the real world by changing the key corresponding to the position of the chief of personnel department. A member who wants to send an encrypted document to the chief of personnel department may encrypt the document by use of the public key corresponding to the conventional key for this position (chief of personnel department). The new chief of personnel department can check the encrypted information by use of the public key corresponding to the former position without changing the information which has been already encrypted.

In a group having a purpose such as a project group in a company, the work based on cooperative work and the positions of a plurality of members is important, and the members of the cooperative working group or individuals who are taking a position are not fixed. Therefore, strict confidentiality between the inside and outside of the group is required.

Recently, the system for giving assurance of a certain level to the public key, called authentication office, in the information network service has been popularly used, it is possible to exclude vitiated keys by use of an authentication office in the present invention.

Next, respective components of the present invention are described. The respective components described below are described.

(1) Complex lock
(2) Group lock
(3) Individual lock
(4) Private key of an individual lock
(5) Complex lock list
(6) Trust body
(7) Authentication office (1) Complex Lock The complex lock is a generic name of the lock for realizing the group lock (role lock) and individual lock described hereinafter, and in detail the electronic data having components described herein under.

a. Name

A name is a character string for indicating an substrate in the real world corresponding to a complex lock which a person can read, and takes a role as an identifier of the complex lock. It is not desirable to use a space or confusable character string so that a person does not recognize confusingly different character strings as the same character string.

b. Forming Date and Forming Personnel.

The forming date and forming personnel are the date when the complex lock is formed and the personnel who forms the complex lock. The forming personnel writes a signature on all the formed complex locks. The signature procedure includes encryption of the electronic data which constitutes the complex lock by use of the individual key of the forming personnel.

c. A Private Key which is Encrypted by Use of the Common Key

This is the encrypted key which is formed by encrypting the private key of the decrypting lock by use of the common key.

d. List of Common Key

The list of common key is a list formed by a method in which the common key formed by encrypting the private key of the common lock is encrypted by use of the public key of the member and the name of the member (any data for identifying the member may be used) is given as a label. The common key can be decrypted by use of the private key of the member, and further as the result, the private key of the complex lock is decrypted to acquire. A cryptography sent from others can be decrypted by use of the private key of the complex lock.

e. Public Key

The public key is the public key of the complex lock. The data is converted to cryptography by use of the public key when the information is encrypted.

f. Private Lock List of Changing Lock.

A pair of a public key and a private key for controlling the changing right of the complex lock is required independently of the pair of the public key and the private key used for maintaining the confidentiality of the information. This pair is referred to as changing lock. The complex lock holds the list formed by a process in which the private key of the changing lock is encrypted by use of the public key of the changing right holder and the name of the changing right holder is given as a label. Only the changing right holder of the complex lock is allowed to form a complex lock of a new version by changing the complex lock, for example, by adding or deleting a member. The changing right holder is previously designated. When a complex lock is changed by a changing right holder and changed to a new version, the complex lock can be set automatically so that a person who trusts the old version can trust the new version. This is referred to as an automatic trusting mechanism. The trust of the lock will be described below. To clarify that the complex lock is changed by a proper changing right holder, a signature is written by use of the private key of the changed lock when the complex lock is changed. However, if all members of the complex lock have the changing right of the complex lock, a pair for maintaining confidentiality is used. In this case, the signature is written by use of the private key of the current version.

g. Public Key of Changed Lock.

The public key of the changed lock is the counter part of the private key of the above-mentioned changed lock for constituting together a pair, and used for decryption of the complex lock with signature by use of the above-mentioned private key of the changed lock, it may be possible to confirm the signature. In addition, the term of validity of the complex key or the term of validity during the off-line period when the authentication office is not available for communication is added to control the use of the complex lock.

(2) Group Lock

The group lock is the complex lock corresponding to the group of the real world. The group includes a plurality of members generally. The group lock functions also as the role lock (for example, chief of personnel department).

(3) Individual Lock

The individual lock is a complex lock corresponding to an individual. The individual lock is realized by means of the complex lock. A member of the complex lock as the individual lock specifies a trustee. The trustee means a person other than the individual to whom the same right as the individual has is given with conditions. This system allows the trustee who can take a role as an alternative to the individual to decrypt the information when the individual forgets the pass phrase. For example, the individual lock is provided to avoid the risk caused by depending on one individual to keep the confidentiality of information and to decrypt information in the company. Further the individual lock can be used to audit or censor the information. It may be possible to set the condition that the approval of a plurality of specified trustees is required for the trustee to use the individual lock.

(4) Private Key of the Individual Lock

The private key of the individual lock is protected so as to be accessed by only the user. For example, the private key is protected by the common key cryptography technique in which a pass phrase known only by the individual (user) is used as the key for decrypting the cryptography. Otherwise, the private key may be protected by a method in which the private key of the individual lock is stored in a special device (IC card, PDA (Personal Digital Assist)), which the user can carry always, and it is taken out when it is required. In addition, the private key may be protected by a method in which the physical and bodily feature of the user (finger print, voice print, eyeground neurolemma pattern, and the like) is detected for identification. Alternately, the private key may be protected by a method in which the feature of a signature is detected for identification. Other various access control methods may be employed. As described above, only the user can get the private key when it is necessary.

(5) Complex Lock List

The complex lock list means the complex lock list in which the trustability of individuals is clarified. The complex lock and the corresponding trustability are maintained in the form of a pair. An individual is judged depending on the trustability in the list when the complex lock is used. The trustability of the complex lock which is not listed in the list is interpreted to be unclear. For example, the complex lock list is used when an individual or a group who is allowed to decrypt the cryptography is specified in the complex lock list to get the public key from the corresponding complex lock and an encrypted private key is generated. In other words, the complex lock list is a public lock list in which the public key of trusted individuals and groups is registered indirectly therefore, the complex lock list may be a public lock list in which the public keys of individuals or groups are registered directly. The complex lock itself may be a complex lock which is stored in an apparatus located far apart for reference in addition to the complex lock stored in an apparatus located here, and otherwise the complex locks stored in this apparatus and the outside this apparatus are used interchangeably.

(6) Trust Body

In the present invention, the complex lock used in a group can be generated by anyone, but cannot be an effective key without trust. The trust of the complex lock means that the actual correspondence between the group (including role) which is existing as a substance in the real world and the complex lock which is expected to be correspondent to the group is trusted. In detail, not only the correspondent relationship between the group and the complex lock but also the coincidence between the member of the group in the real world at the time point of trusting and the member included in the complex lock is required. For example, it is assumed that there is a complex lock having the name "Personnel Department, First Section". It may be possible that a group in the real world having the name "Personnel Department, Personnel Section" exists, but a group in the real world having the name "Personnel Department, First Section" does not exist. It may be also possible that though a group in the real world having the name "Personnel Department, First Section" exists, a corresponding proper complex lock does not exist. Therefore, a complex lock cannot be trusted based on only the name of the complex lock. Also a complex lock cannot be trusted in the case that, though some members in "Personnel Department, First Section" have been changed, such changed members remain in the member of the complex lock.

The information which describes trustability of the complex lock is referred to as trust information. The information which describes the trustability of the trust information itself is also included in the trust information. The main body which holds the trust information is referred to as the trust body. Trusting the trust information and the complex lock based on what reason is dependent on the trust body. The trust body is classified into two types, namely individual and authentication office which will be described in (7) hereinafter. A trust body can trust other trust bodies. In such a case, a trust body who is trusted, is referred to as a trusted body. A trust body uses the complex lock only when the complex lock is trusted. When a trust body does not have the direct trust information on the complex lock, it may be possible that the trust body can trust the complex lock if another trust body which is trusted by the trust body trusts the complex lock.

For example, it is assumed that there is an individual "Mr. Tanake" and an authentication office "X Trading Company" as the trust body. They are in the relation that the individual "Mr. Tanaka" trusts automatically any complex lock as long as the authentication office "X Trading Company" trusts it if the individual "Mr. Tanaka" trusts the authentication office "X Trading Company", but on the other hand, the authentication office "X Trading Company" does not necessarily trust the complex lock which the individual "Mr. Tanaka" trusts.

The degree of trustability is grouped into ratings, and the rating is referred to as trust level. It is possible to obtain the trustability of a complex lock having unknown trustability by calculation using the trust level. The trust level used at that time is, for example, an exemplary table of trust level shown herein under.

TABLE 1

Level ⊙: fully trust
Level ○: sufficiently trust
Level Δ: somewhat trust
Level ?: unknown
Level x : not trust FIG. 1 shows an example in which the trust level of a complex lock having the unknown trust level is obtained from the trust level of complex locks of two different trust bodies, for example, two different individuals A and B, which are independent from the same complex lock. The first row in FIG. 1 shows the trust level of the individual A and the left column in FIG. 1 shows the trust level of the individual B, and the result is shown in the form of table. For example, if the trust level set on the individual A is "○" and the trust level set on the individual B is "?", then the trust level of the complex lock is "○".

For example, the calculation rule as shown in FIG. 2 is used for calculation of the trust level in which the trust level in this trust body and the trust level in another trust body of this trust body or the trust level in the complex lock are used. The first row in FIG. 2 shows the trust level in this trust body and the left column in FIG. 2 shows the trust level in another trust body of this trust body or the trust level in the complex lock, and the result is shown in the form of tables. For example, if the trust level in this trust body is "○" and the trust level set by this trust level is "?", then the trust level of the complex lock is "?". As described above, it is possible to determine the trustability of a trust body having the unknown trustability or complex lock by use of the calculation rule shown in FIG. 1 or FIG. 2.

(7) Authentication Office

The authentication office is one of trust bodies as described above. The function provided by the authentication office is to express or provide the public trust in the unit like an company or organization, where, for example, some cryptography system is used. The trust criterion of the complex lock in the authentication office is determined arbitrarily by a company or an organization which operates this authentication office. Several methods as described below are available as the method for determining the trust criterion. In the following description, "to guarantee" means the action that an individual other than the registrant, certifies the validity of the complex lock to be registered.

a) The validity is confirmed by means of any procedure performed by a specific manager of the authentication office. When the validity is confirmed, the authentication office trusts the complex lock. Any procedure described herein above means arbitrary procedure in the real world. For example, any procedure includes fingerprint put on the application form or confirmation procedure by means of an identification paper or card of the applicant. Otherwise, the complex lock may be trusted for registration by means of various ways, for example, duplicated confirmation of the name, guarantee by other specific individual indicated for each registrant, guarantee by guarantors in a prescribed number, or signatures of individuals whom the authentication office trusts in a prescribed number determined previously.

EXAMPLE

An example of the cryptography system which uses the group lock is described below. A case in which the group lock in the complex lock as described above is used, is described below, and in the case that the other type of the complex lock, namely the individual lock, is used. Similarly the cryptography system is structured with the same structure and the same manner except that the member in the group lock is changed to the trustee in the individual lock. The before-mentioned role lock is included in the special application of the group lock, to make the function of the group lock effective as the role lock, the number of members of the group lock is set to 1, and the individual who is engaged in the role currently may be assigned as the only member. It may be possible to operate the group lock in which the member of the role lock of the vice-president includes a secretary in addition to the vice-president himself.

Each member who uses the cryptography system of the present invention holds two lock lists. In detail, a) "public lock list" namely the list of the group lock which respective members trust and the individual lock, and b) "private lock list" namely the list of the group lock from which each member can acquires directly or indirectly the private key based on the private key of the member itself. For the purpose of simplicity, it is assumed that the group and individual lock included in the "public lock list" are trusted, and the medium trust level such as "somewhat trust" is not given. Whether it is trusted or not is determined based on the above-mentioned calculation rule of degree of trustability or based on the judgement of a user, and the detailed description in the example is omitted. However, it is assumed that the group lock after change is trusted automatically in the case that automatic trust mechanism in which the group lock used just before the change is trusted when the group lock is changed is in function, namely in the case that the group lock used before the change is trusted. The registration procedure to the above-mentioned authentication office is not described directly hereinafter in the example, in the case that there is the authentication office in a network as described herein above, the lock which is generated or changed is registered to the authentication office. However, this registration procedure is not sine qua non of the present invention.

First, the whole structure of the example is described with reference to FIG. 3. The basic function of the present example is to transmit the information correctly and confidentially from an individual to another individual. The individual may belong to a group. The information may be transmitted by means of direct transmission such as mail or indirect transmission through a file service.

Not only the cryptography but also the individual public key or group lock is transmitted between individuals as shown in FIG. 3 as required. In the case that the judgment to determine whether the individual public key and group lock properly correspond to the individual and group which exist in the real world is required, it is necessary to establish a judgement procedure.

When a plain document in "individual" shown in FIG. 3 is encrypted to a cryptographic document, a lock corresponding to the lock which an individual or a group who is to be allowed to decrypt the cryptographic document holds is selected from the lock list for encryption. The cryptogram which the selected individual or an individual who belongs to the selected group can decrypt is thereby generated. Otherwise, a plain document is decrypted by means of a common key KA, and a lock corresponding to the lock which an individual or a group who is to be allowed to decrypt the decrypting key KB required to decrypt the cryptography holds is selected from the lock list, and the selected lock is encrypted and transmitted.

When the transmitted encrypted information is decrypted, the encrypted information is decrypted by use of the individual private key of the individual if the obtained cryptographic information can be directly decrypted by use of the individual private key of the individual. If the obtained cryptographic information can be decrypted by use of the group lock to which the individual belongs indirectly or directly, the group lock is converted to the group private key by use of the individual private key of the individual to obtain the group private key, and the cryptographic information is decrypted by use of the group private key. The group private key is discarded just after it is used, and the individual does not hold it. In this system, only the individual private key is required for "individual" to keep it confidential. In the case that the cryptographic information is decrypted by use of the common key KA, first the decrypting key KB which is necessary for decryption is decrypted by use of the individual private key of the individual. If the cryptographic information can be decrypted by use of the group to which the individual belongs, the group lock is converted to the group private key by use of the individual private key of the individual to obtain the group private key, and the decrypting key KB is acquired by use of the group private key and the cryptographic information is decrypted to a plain document by use of the decrypting key KB.

[Group Lock]

Figure 4:
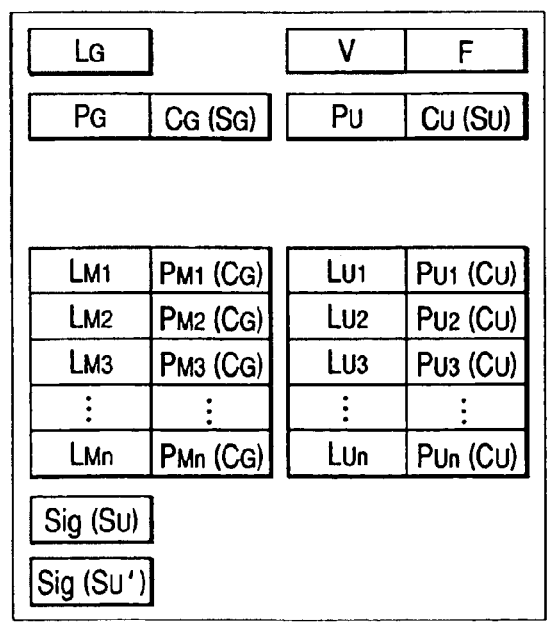
FIG. 4 is a diagram for illustrating the structure of the group lock of the present invention.

The structure of the group lock in the present example is shown in FIG. 4. Reference characters shown in FIG. 4 are described herein under.

$L_G$:the label of this group lock.

The label is a character string. The duplication is not allowed in a lock list of an individual. The label is not used as an identifier because duplication may occur as a whole. As the public key is not coincident unless the label is coincident, the processing can be performed faster resultantly.

$P_G$:the public key of this group lock

The public key of this group key is a public key corresponding to the public key cryptography system to be used, and this is generally a data string having a fixed length consisting of 512 bits to 2048 bits. When a plain document is encrypted so that all individuals who belong directly or indirectly to this group can decrypt the encrypted document, this public key is used for encryption. Further, when the information with a signature of an arbitrary individual who belongs directly or indirectly to this group is to be confirmed, the signature is confirmed by use of this public key. The public key is included in the group lock as it is, and any individual can check the public key.

$S_G$:Private key of this group

The private key of this group is a private key corresponding to the public key cryptography system which is used, and generally a data string having a fixed length consisting of 512 bits to 2048 bits. The private key of this group is used when a cryptogram encrypted by use of the corresponding public key is decrypted. The private key of this group is used also when an arbitrary individual who belongs directly or indirectly to this group writes a signature as an individual of this group. The private key is a key which is encrypted combinedly by use of the private key of an individual and the common key directly or indirectly, and when the private key is used, first the common key is decrypted by use of the private key of the individual and the private key of the group lock is thereafter decrypted for acquiring. The private key of the group lock is discarded just after use and is not held alone.

$C_G$:Common key for encrypting the private key of the group lock

This key is the common key, and a known key such as DES, FEAL, or the like may be used. The size of the key consists generally of 40 bits to 128 bits.

$C_G(S_G)$:Private key of the group lock encrypted by use of the common key CG

This key is a cryptogram which is formed by encrypting the private key $S_G$ of the group lock by use of the common key. The common key $C_G$ is necessary to acquire the private key $S_G$.

Mi:Member of this group

Mi is the existence in concept, and does not appear in the data structure directly. A member may be an individual or a group. As described hereinbefore, in the case of an individual key instead of a group key, the member means the trustee.

$P_U$:Public key for changing this group lock

This key is a public key corresponding to the public key cryptography system which is used, and is generally a data string consisting of 512 bits to 2048 bits. It is required that the group adds or deletes the member. As the method for identifying the person who has the right to perform such change, a pair of an exclusive public key and private key is used. This key is such public key. The group key includes the private key for changing which has been decrypted directly or indirectly by use of the individual private key belonging to the individual having the changing right. When the group lock is changed, the new group lock is signed by use of the private key for changing. Because only the changing right holder can have the private key for changing, the signature validates that the change has been done by a proper changing right holder. The validation is processed automatically if the previous group key is trusted. Anyone can refers this public key for changing because the public key for changing is included in the form as it is.

$S_U$:Private key for changing this group lock

This key is a private key corresponding to the public key cryptography system which is used, and is generally a data string of fixed length consisting of 512 bits to 2048 bits. The function is the same as that described for $P_U$.

$C_U$:Common key for encrypting the private key $S_U$ for changing the group lock.

This key is a conventional common key. A known key such as DES, FEAL, or the like may be used. The size of a key is generally 40 bits to 128 bits.

$C_U(S_U)$:Private key for changing the group lock which has been encrypted by use of the common key $C_U$.

This key is a cryptogram which has been formed by encrypting the private key $S_U$ for changing the group lock. The common key $C_U$ is necessary to obtain the private key $S_U$.

V:Version number of this group lock

V is a natural number. V is 1 when a new group lock is generated. V indicates the version of the group lock. When the group lock is changed, the version number is added 1 on the reference version number.

F:Value indicating processing of immediately precedent version.

F is any one of "unnecessary", "necessary", and "deletion". When the group lock is changed, an individual who has the immediately precedent version, is required to deal the immediately precedent version properly because the individual has the new version. The value "unnecessary" means that the immediately precedent version is unnecessary. The value "necessary" means that the immediately precedent version is necessary to validate the signature written by use of the immediately precedent version to decrypt a cryptogram formed by use of the immediately precedent version. In this case, the new version should be used for new encryption and signature. The value "delete" is approximately equal to "unnecessary", and means that the immediately precedent version should be deleted when the individual cannot acquire the private key of the new version. When a group lock is newly generated, this value is meaningless.

Ui:Changing right holder of this group

Ui is a conceptual existence and does not appear on the data structure. The changing right holder is assigned to an individual or a group.

Lm:Label of Mi

Lm is a label character string. This label is the label of a group lock of other group or individual key who is a direct member of this group lock. Though the individual lock is not described in the present example, the individual lock consists of a private key which is managed by the corresponding individual and a public key which is open, and a label is not given at least to the public key.

$P_{Mi}$ Public key of Mi $P_{Mi}$ is a public key corresponding to the public key cryptography system which is used, and is generally a data string of fixed length consisting of 512 bits to 2048 bits. The public key of the direct member of this group.

$P_{Mi}(C_G)$:$C_G$ encrypted by use of $P_{Mi}$ $P_{Mi}$ is obtained by encrypting $C_G$ by encryption processing corresponding to the public key cryptography system which is used. To acquire $C_G$ by use of $P_{Mi}$, the private key $S_{Mi}$ corresponding to $P_{Mi}$ is necessary. This is held by means of an arrangement which uses the corresponding Lm as an index.

$L_{Ui}$:Label of Ui

This is a label character string of Ui. This is the label of the individual lock of the individual who is the changing right holder of this group lock.

$P_{Ui}$:Public key of Ui

This is the public key corresponding to the public key cryptography system which is used, and is generally a data string of a fixed length consisting of 512 bits to 2048 bits. This is the public key of the individual who is the changing right holder of this group lock or the public key of the group lock.

$P_{Ui}(C_U)$:$C_U$ encrypted by use of the public key of Ui

This is obtained by encrypting $C_U$ by means of encryption processing corresponding to the public key cryptography system which is used. To acquire $C_U$ by use of this $P_{Ui}$, the private key $S_{Ui}$ corresponding to $P_{Ui}$, is necessary. This is held by means of an arrangement which uses the corresponding $L_{Ui}$ as an index. In the present example, the private key is added with the information to identify the data and then encrypted like the packet data structure in packet communication. Therefore, whether the private key is normally decrypted or not, can be judged easily based on the additional information when the encrypted private key is decrypted.

Sig (Su):Signature by $S_U$ for the whole.

This is a data string for indicating a signature. Herein, the whole means $L_G$, $P_G$, $C_G$ ($S_G$), V, F, $P_U$, $C_U(S_U)$, $L_{Mi}$, $P_{Mi}$ ($C_G$), $L_{Ui}$, and $P_{Ui}$ ($C_U$). Signature means encryption processing by use of the private key $S_U$. In the public key cryptography system, conversely to the normal system, the data is encrypted by use of the private key and the encrypted data can be decrypted by use of the public key. Because the data must be encrypted by use of the private key to decrypt it by use of the public key, it is confirmed that the signature is written by use of the private key by confirming decryption by use of the public key. Actually, the message digest is applied to the target range and a signature is processed by use of the private key $S_U$. The message digest means, which is a process in which the information consisting of about 128 bits, depending on the content of the target range, is generated regardless of the size of the target range because the encryption of the entire target range of the signature requires high cost. A disclosed message digest processing algorithm is used and a key is not used. For confirmation, the target data is subjected to message digest, and whether the signature and the decrypted result are coincident or not is confirmed. The message digest processing is a process similar to the check sum, and on the other hand by using the direction function in the process, it is made difficult to forge the input data which generates the same result. Further, because the size of the generated data is large, it is difficult to forge the data as a round robin. The name "Message digest" is a generally known name in the cryptography related field, and a well known system. It is assumed that the message digest processing function is $f_{Md}$, the complex operation of the target data is expressed by arithmetic sum, and the signature written by use of $S_U$ is expressed by a function $S_U$, then Sig ($S_U$) is obtained as the result of the following processing.

$$S_U \left( f_{Md} \left( L_G + P_G + C_G(S_G) + P_U + C_U(S_U) + \sum_{i=1}^{n} (L_{Mi} + P_{Mi}(S_G) + L_{Ui} + P_{Ui}(S_U)) \right) \right)$$ [Expression 1]

$S_U'$:$S_U$ of the precedent version

This is a private key corresponding to the public key cryptography system which is used, and is generally a data string of fixed length consisting of 512 bits to 2048 bits. This is the private key for changing the immediately precedent version. This functions similarly to $S_U$ (in detail, refer to the description of $P_U$).

Sig ($S_U'$):Signature by use of $S_U'$ for the whole.

This is a data string which indicates a signature. Herein the whole means $L_G$, $P_G$, $C_G$ ($S_G$), V, F, $P_U$, $C_U$ ($S_U$), $L_{Mi}$, $P_{Mi}$ ($C_G$), $L_{Ui}$, $P_{Ui}$ ($C_U$), and Sig ($S_U$). This is not given when this is generated newly. Sig. ($S_U'$) is expressed as described herein under similarly to the Sig ($S_U$).

$$S_U \left( f_{Md} \left( L_G + P_G + C_G(S_G) + P_U + C_U(S_U) + \sum_{i=1}^{n} (L_{Mi} + P_{Mi}(C_G) + L_{Ui} + P_{Ui}(C_U) + Sig(S_U)) \right) \right)$$ [Expression 2]

In the present example, the signature covers the whole data, however the signature may partially cover the data which is wanted to be prevented from forging.

[Public Lock List]

FIG. 5 shows the structure of the public lock list in the present example. The public lock list is owned independently by individuals, the group lock and the individual lock which the individual trusts, is held by the arrangement having the label of the lock as an index.

As shown in FIG. 5, the public lock list consists of Gi (trusted group lock), $L_{Gi}$ (label of the group lock Gi), Ii (public key of trusted individual), and LIi (label corresponding to the public key Ii of the individual).

The judgement of the trustability of the lock which is required when a new data is added to the public lock list relied on the public lock list holder in the present example. However, the subsequent version of the group lock which has been trusted is subjected to automatic trusting. Otherwise, it is possible to determine the trustable lock or trust body by means of the calculation rule associated with the above-mentioned trust level. In this case, the trust level can be determined surely and easily by using the trust relation registered in the above-mentioned authentication office.

A decryptable group or individual is designated for encryption, at that time, and at least one or more corresponding group locks or individual locks are selected from the public lock list for designation.

When the validity of the signature is confirmed, the public key corresponding to the private key which has been used for writing the signature, is taken out from the public lock list for using.

[Private Lock List]

The structure of the private lock list in the present example is shown in FIG. 6. The private lock list is owned independently by individuals, and holds the group lock by which the individual can acquire the private key in the form of an arrangement having the label of the group lock as an index. The private key is acquired by directly or indirectly by applying the individual private key of the individual to the group lock.

As shown in FIG. 6, the private lock list consists of Gi (group lock which is used with using the private key) and $L_{Gi}$ (label of the group lock Gi).

If the group private key in the internal of the group lock can be acquired by directly or indirectly by applying the individual private key of the individual in the process, to add the group lock to the public lock list, addition to the private lock list is performed when added. Therefore, it is not necessary for the user to be conscious of addition process. It should be recognized that the fact that the group private key in the internal of the group is acquired by use of the individual private key of the individual, does not necessarily mean that the group key is trustable.

The judgement of the possibility of decryption is made faster by using the private lock list for decryption. Further, in the actual decryption processing, the private lock list is used for acquisition processing of the necessary group private key.

In writing a signature, the group private key in the private lock list other than the individual private key of the individual may be used for writing a signature. If a signature is written as described above, then the receiver who receives a cryptogram can identify the sender either an individual or group. Further, if the public key of the private lock used for the signature is attached together with the signature, the signature is validated easily and the receiver can validate the sender easily based on the public key without checking the signature.

[Cryptogram]

Figure 7:
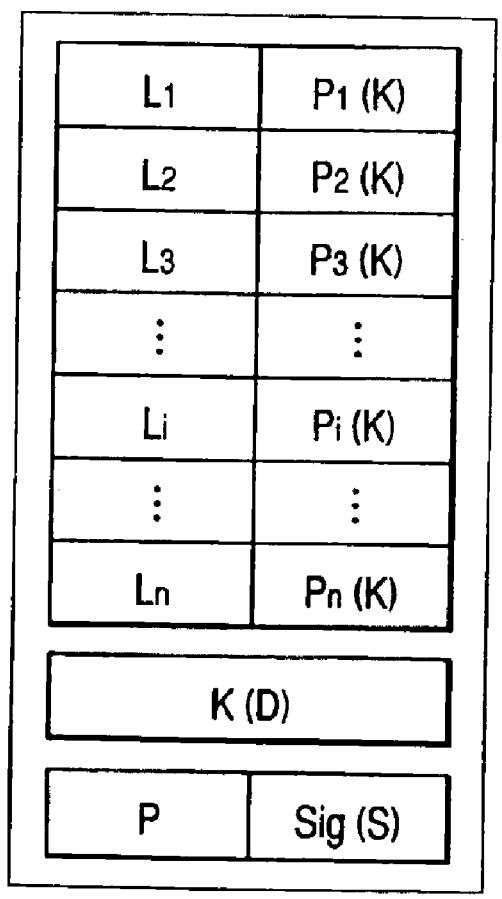
FIG. 7 is a diagram for illustrating the structure of the cryptography of the present invention.

The structure of the cryptogram of the present example is shown in FIG. 7. In the present example, $L_{Mi}$ of the group lock and the list of the paired $P_{Mi}$ ($S_G$) have the same structure, and a cryptogram can be thereby decrypted by using any one of a plurality of private keys. As the result, when the information which is wanted to be disclosed to a plurality of members is encrypted, it is not necessarily required to form the group lock. In other words, a receiver group consisting of individuals and groups selected arbitrarily from the public lock list is temporarily formed.

The meaning of each character shown in FIG. 7 is described below.

Pi:Decryptable group lock or public key of an individual

This is a public key corresponding to the public key cryptography system which is used, and is generally a data string of fixed length consisting of 512 bits to 2048 bits.

Li:Label of Pi

This ia a label character string.

D:Plain document (information to be confidential)

This is an arbitrary character string.

K:Common key formed by encrypting the plain document D.

Because encrypting processing and decrypting processing are slow, due to the public key cryptography, the hybrid system in which a plain document is encrypted by means of the common key cryptography and only the common key is encrypted by means of public key cryptography, is generally employed. The K is the common key. In the present example, K is encrypted respectively by use of K to thereby enable a plurality of groups or individuals to decrypt the encrypted document.

Pi (K):K encrypted by use of Pi.

K (D):D encrypted by use of Pi.

S:Private key which a member who performs encryption processing can use

This is a private key used when a signature is given to a cryptogram. Any one of the individual private key of the individual and the private key of the group lock included in the private lock list is used.

P:Public key P which is paired with the private key S used for signature

The public key corresponding to the private key which the signer has used for signature according to the assertion is used when the signature is validated. It is held to specify the public key. If the public key is included in the public lock list of the receiver itself in the receiver side who has received the cryptogram, the receiver can validate that the signature written by a group or an individual who the receiver trusts is put, and the receiver can validate a sender individual or sender group who has transmitted the cryptogram.

Sig(S):Signature by S for the whole.

This is a data string for indicating a signature. Herein, the whole means Li, Pi(K), and K(D). The signature is referred to the description of Sig ($S_U$) in the structure of the group lock. According to the same expression, Sig (S) is expressed as described below.

$$S\left(f_{Md}\left(\sum_{i=1}^{n}(Li+Pi(K))D\right)\right) \quad \text{[Expression 3]}$$

[Flow of Processing]

Detailed process flow of the present example is described with reference to flowcharts shown in FIG. 8 to FIG. 16.

[Group Lock Generation]

Figure 8:
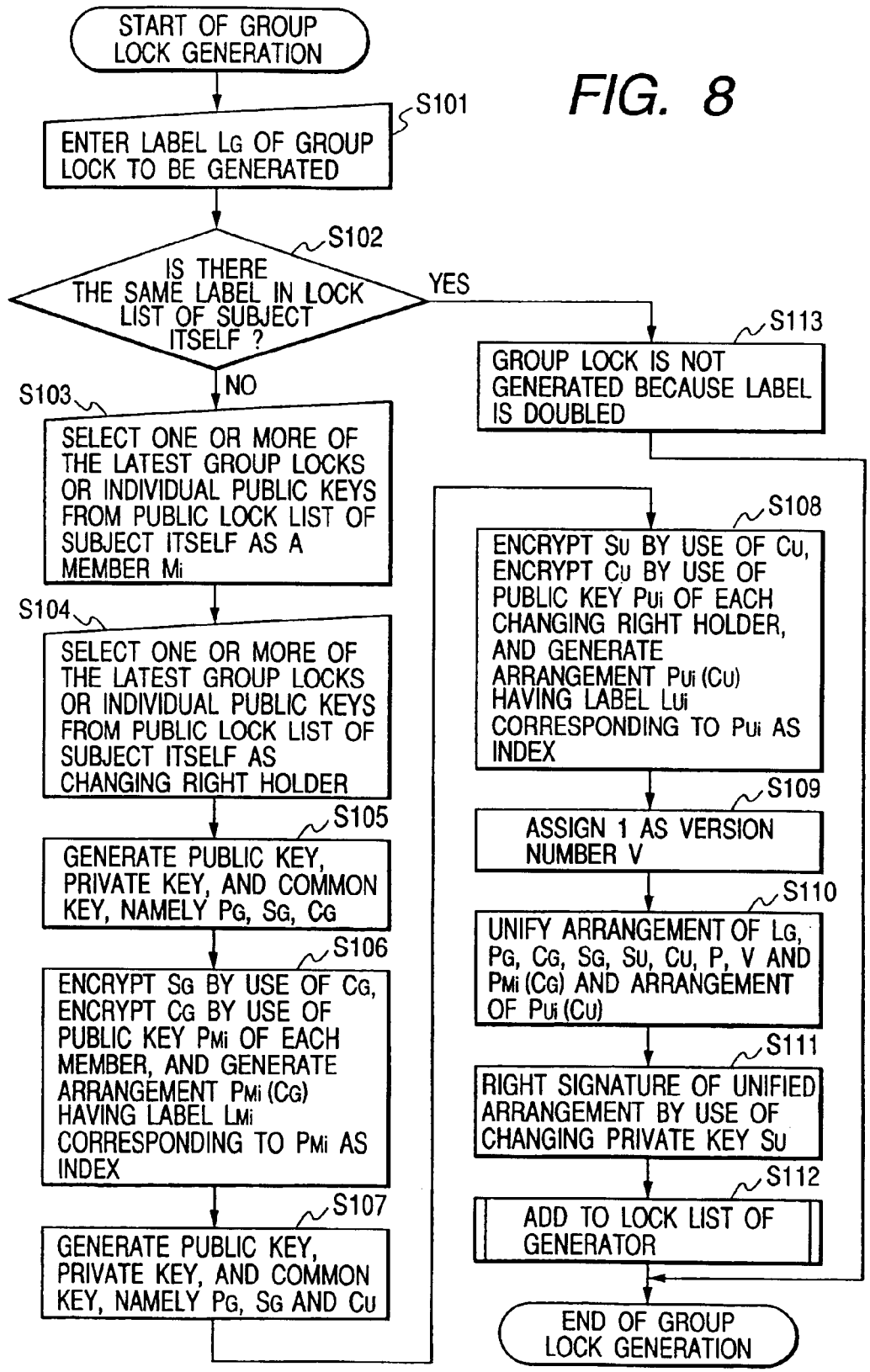
FIG. 8 is a flowchart for describing the group lock generation flow of the present invention.

The flowchart for describing group lock generation is shown in FIG. 8. It is required that the group lock or the public key of an individual corresponding to a member who is newly assigned, is trusted by the generator when a group is generated (or when a group is added or changed). If the group lock or the public key of an individual corresponding to a member who is newly assigned is not trusted, trusting namely addition to the lock list must be performed prior to the generation of the group key.

The generated group lock is added first to the lock list of the generator itself. The lock list is the generic name of the public lock list and the private lock list. Further, (when a cryptogram formed by encrypting for the generated group is decrypted, the member of the group needs the group lock. Conversely, when a cryptogram is formed for the group, also the group clock is needed. An arbitrary individual can encrypt. Therefore, it is necessary to distribute to individuals who may encrypt for the member or the group) the generated group lock is distributed to individuals who require it. Otherwise, the complex lock which is stored in the remote center may be sent when the sender of the cryptogram or the receiver requires it, or only the information which requires the complex lock may be sent. In the present example, the description of the distribution is omitted.

The flowchart shown in FIG. 8 is described in detail. The label of the group lock generated in step 101 is entered. In step 102, whether a lock having the same label as the input label exists in the lock list is tested. Generation of a lock having the duplicated label is refused, and if there is already a lock having the same label in the lock list, then the sequence proceeds to step 113, and generation of a group lock is stopped. On the other hand, if there is no lock having the same label, then the sequence proceeds to step 103.

In step 103 and step 104, a member Mi and a changing right holder Ui are designated. The member is a member who uses the cryptography system in which the group lock is used, and the changing right holder has the right to change the group lock, for example, to add or delete the member. The member and the changing right holder are not limited to an individual but may be a group, and designated by selecting one or more group locks or public keys of individuals from among the public lock list which the group lock generator has.

In step 105, a private key $S_G$, public key $P_G$, and common key $C_G$ of the group to be generated, is generated. In step 106, the generated private key $S_G$ is encrypted by use of the common key $C_G$ to generate $C_G(S_G)$. Further, $P_{Mi}(C_G)$ which is formed by encrypting the common key $C_G$ by use of public keys $P_{Mi}$ of respective members Mi is generated, and each $P_{Mi}(C_G)$ corresponds to the label $L_{Mi}$.

In step 107, a changing private key $S_U$, changing public key $P_U$, and changing common key $C_U$ of the group lock to be generated is generated. In step 108, the generated group lock changing private key $S_U$ is encrypted by use of the common key $C_U$ to generate $C_U(S_U)$. Further, the common key $C_U$ is encrypted by use of the public key $P_{Ui}$ of the changing right holder to generate $P_{Ui}(C_U)$, and each $P_{Ui}(C_U)$ corresponds to the label $L_{Ui}$.

In step 109, the version number of the group lock to be generated is set. In step 110, respective data of $L_G$, $P_G$, $C_G(S_G)$, $P_U$, $C_U(S_U)$, V, $P_{Mi}(C_G)$, and $P_{Ui}(C_U)$ are unified together. In step 111, a signature is written on the unified previous data by use of the changing private key $S_U$, that is, data conversion is performed. In step 112, the group lock is registered additionally to the lock list of the group lock generator and thus the generation of the group lock is brought to an end. The generated group lock has the structure shown in FIG. 4 as described above.

[Addition to a Lock List]

Figure 9:
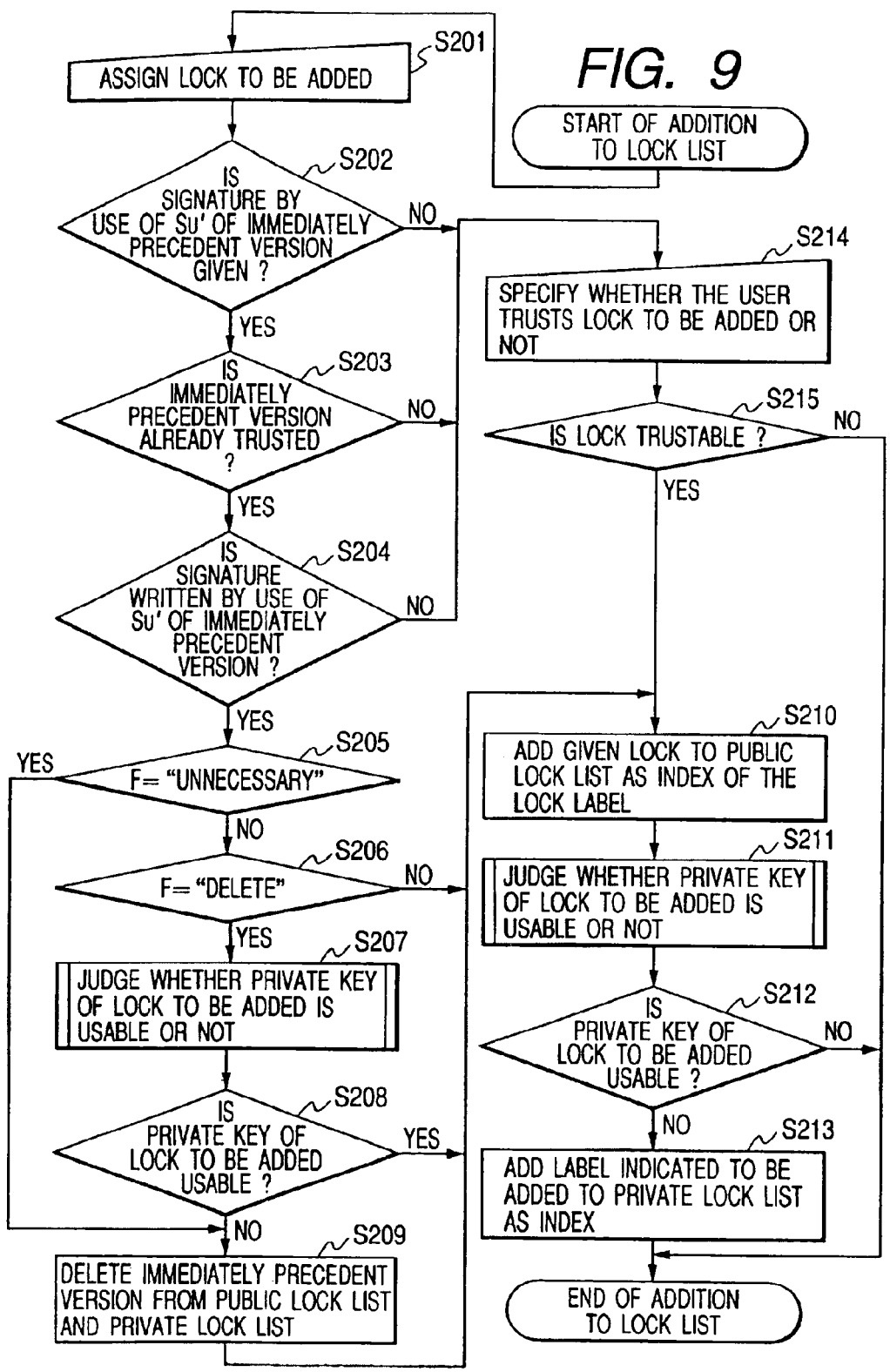
FIG. 9 is a flowchart for describing the flow for addition to a lock list of the present invention.

A flowchart of the addition procedure to a lock list, is shown in FIG. 9. Only the group lock or public key of the individual who is trustable is added to the lock list. This processing is used when the group lock which is generated or changed (generation of a new version) by itself, is added and when the group lock which is obtained from others is added.

In the present example, the process associated with distribution such as distribution of a key by means of an authentication office and distribution of a key by way of e-mail or floppy disc, is not included. The process for calculating the trustability of a key by calculating the trustability in a signer or the trustability in a key of a signer is omitted. It is possible to include the above-mentioned acquisition of the trust level obtained by calculation of the trustability and to use it to judge the trustability. In the present example, the automatic trusting procedure of a new version of a group lock which has been already trusted is shown. In the present example, a new version is automatically trusted only when it is validated that the new version is signed by use of the changing private key of the immediately precedent version.

In the addition to a private lock list, only the group lock from which the private key of the group lock can be acquired directly or indirectly by use of the individual private key of the individual itself from the trusted group locks is added.

The flowchart shown in FIG. 9 is described in detail. In step 201, after a lock to be added is specified, the presence of a signature written by use of the changing private key $S_U{}'$ of the immediately precedent version, trustability, and correctness of the signature arejudged in steps 202, 203, and 204, and if any one of them is "YES", then the sequence proceeds to step 214, the judgment, by the trust lock holder itself whether the lock to be added is trustable or not, is entered. If the lock is trustable, the sequence proceeds to step 210, on the other hand if the lock is not trustable, the lock is not added to the lock list. In step 214 and step 215, the calculation to acquire the above-mentioned trustability can be used.

In steps 205 to 209, how to process the precedent version is determined. When an group lock of a new version is added, it is required to properly process the group lock of the precedent version. It is judged based on the F value included in the group key of the new version. A new encryption or writing a signature should not be performed regardless of F value because the precedent version is old. The public lock list and private lock list should be classified into the newest version and the other version. In the present example, the classification is omitted, and only the newest is assigned when used. The processing which depends on F value is described below.

a) In the case of F="necessary", group lock of old version is kept undeleted.

b) In the case of F="unnecessary", group lock of old version is deleted.

c) In the case of F="delete", group lock is kept undeleted if the individual itself can acquire a private key of the new version, and is deleted if otherwise.

In step 210 to 213, addition to the public lock list is performed, the usability of the private key of the lock to be added is judged, and if the usability is YES, addition is performed also to the private lock list.

[Judgement of the Usability of the Private Lock]

Figure 10:
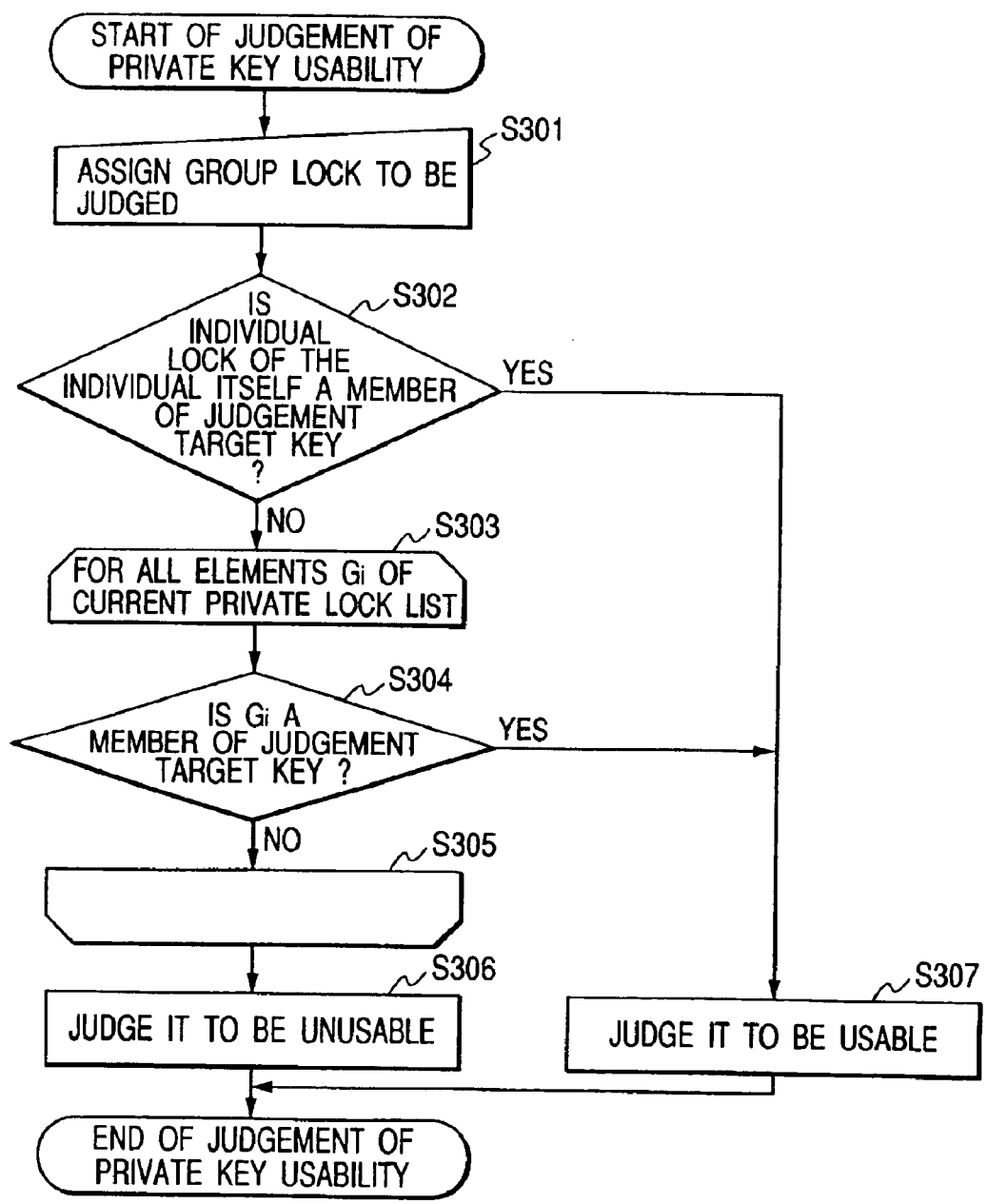
FIG. 10 is a flowchart for describing the flow for judgement of usability of a private lock of the present invention.

A flowchart for judgement of the usability of the private key is shown in FIG. 10. In the processing, whether the encrypted private key included in an arbitrary group lock which is assigned can be acquired by directly or indirectly applying the individual private key of the individual itself is judged.

This processing is used to judge whether a group lock may be included in the private lock list (step 212 in FIG. 9). The same judgement as this processing is necessary to judge whether a group key is usable or not for decryption in other situations. However, in many cases, simple processing to judge whether the group lock is included in the private lock list based on the fact that the group lock included in the private lock list is all the group lock from which the private key is acquired by the subject itself, as long as, it is known at the time point is used, and this processing is directly used not so often.

In the processing, first whether the private key of the group lock directly given by using the individual private key of the individual itself is judged. If the private key is not acquired, whether the private key of the group lock given by direct use of each group key in the private lock list of the subject itself can be acquired or not is judged. The processing may be performed according to this procedure for only the purpose of judgement because the private key of the group lock in the private lock list is already known to be usable.

The flowchart shown in FIG. 10 is described in detail. In step 301 the group lock to be a judgement target is assigned, in step 302 it is determined whether or not the individual lock of the individual itself is a member of the group lock is to be the judgement target, and if it is YES, it is judged to be usable. If it is not a member, in step 303 to step 305, the element Gi of the current private lock list is examined, and whether Gi is a member of the judgment target key or not is judged. In steps 303, 304, and 305, the process is repeated with incrementing i of Gi successively. In the repeating step, if any Gi is a member of the judgement target key, it is judged to be usable.

[Encryption]

Figure 11:
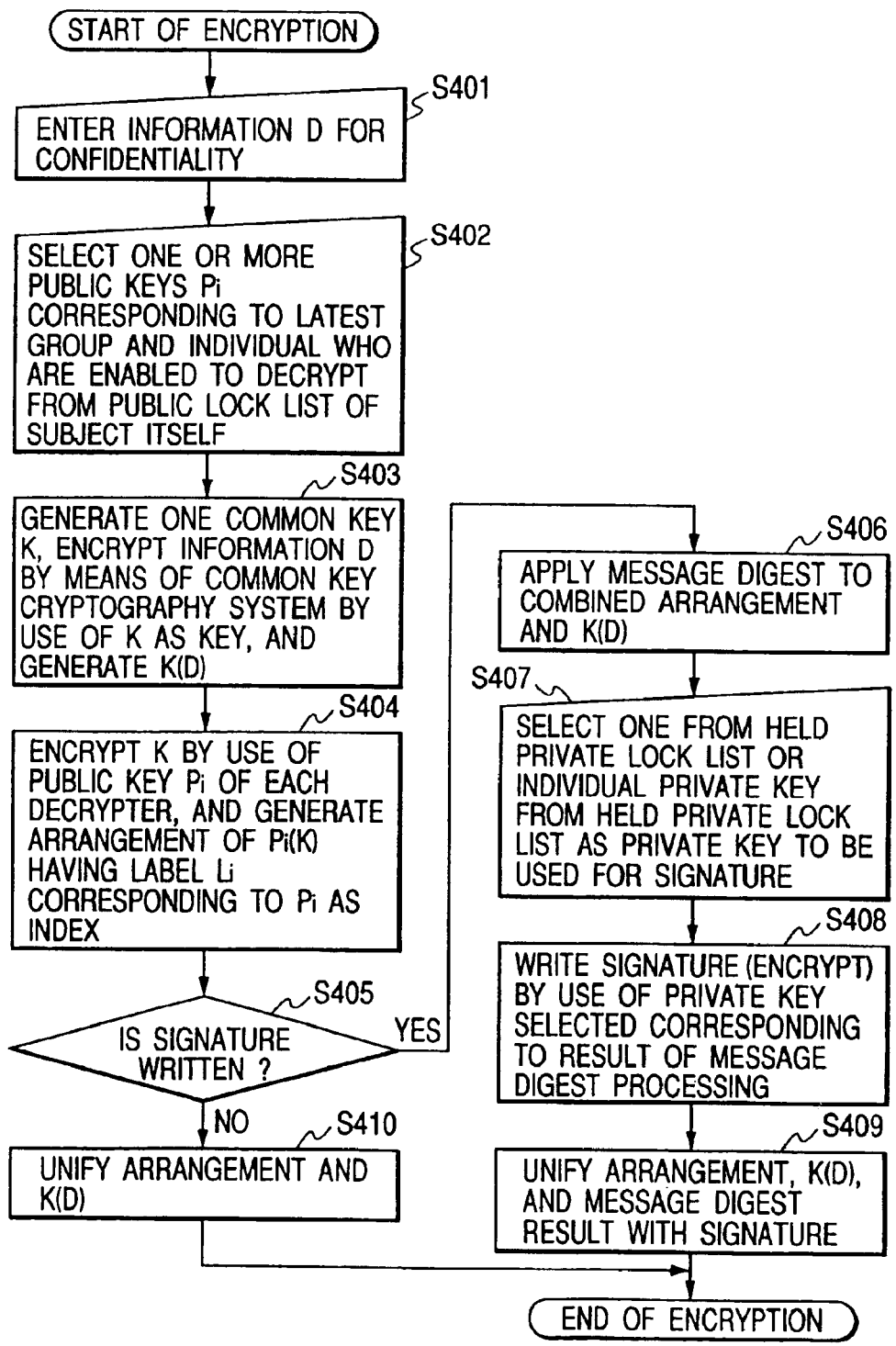
FIG. 11 is a flowchart for describing the encryption flow of the present invention.

The encryption processing flow of information is shown in FIG. 11. The following three items are entered in the processing.

a) Plain document b) Decrypter

One or more decrypter is assigned from the newest group lock or individual public key included in the public lock list.

c) Signer

Only one signer is assigned from the individual private key of the individual itself or newest group lock included in the private lock list. It is not necessary to assign unless a signature is written.

Signing means that the signature target data is subjected to message digest and the resultant signature block is signed by use of a private key. Signing by use of a private key means encryption by use of a private key. The paragraphs "cryptography" in data structure and Sig ($S_U$) in "group lock-in data structure should be referred for details.

The flowchart shown in FIG. 11 is described in detail. In step 401, the information D to be kept confidential is entered, and in step 402, one or more public key Pi corresponding to the newest group and individual which enables decryption, is selected from the public lock list of the subject. In the process, a member who is enabled to decrypt the encrypted data is selected.

In step 403, the common key K is generated, and encryption of the information D by use of the key K is executed according to the public key cryptography system. In this case, the hybrid system in which the plain document is encrypted by use of the common key cryptography and only the common key is encrypted by use of the public key cryptography is employed because encryption processing and decryption processing using the public key cryptography is slow as described in the paragraph of [Cryptography]. The common key K is not necessarily the key which is generated every time when encryption is carried out, and may be the key which is generated as required or may be the fixed key which has been previously determined.

In step 404, K is encrypted by use of the public key Pi of each decrypter to generate Pi (K), and the corresponding label is given. In step 405, whether the generated cryptogram is to be signed or not is judged, and if the judgement is NO, then summarizing of each data is executed in step 410, and the encryption processing is brought to an end. If the judgement is YES, the sequence proceeds to step 406.

Steps 406 to 409 are signature processing step, the data to be signed is subjected to message digest processing (step 406), a key to be used for signature is selected from the private lock list (step 407), signature is executed by use of the selected private key (step 406), and the arrangement K (D) and the signed message digest (=signature block) are combined together (step 409). The encryption processing is ended.

[Decryptability Judgement]

Figure 12:
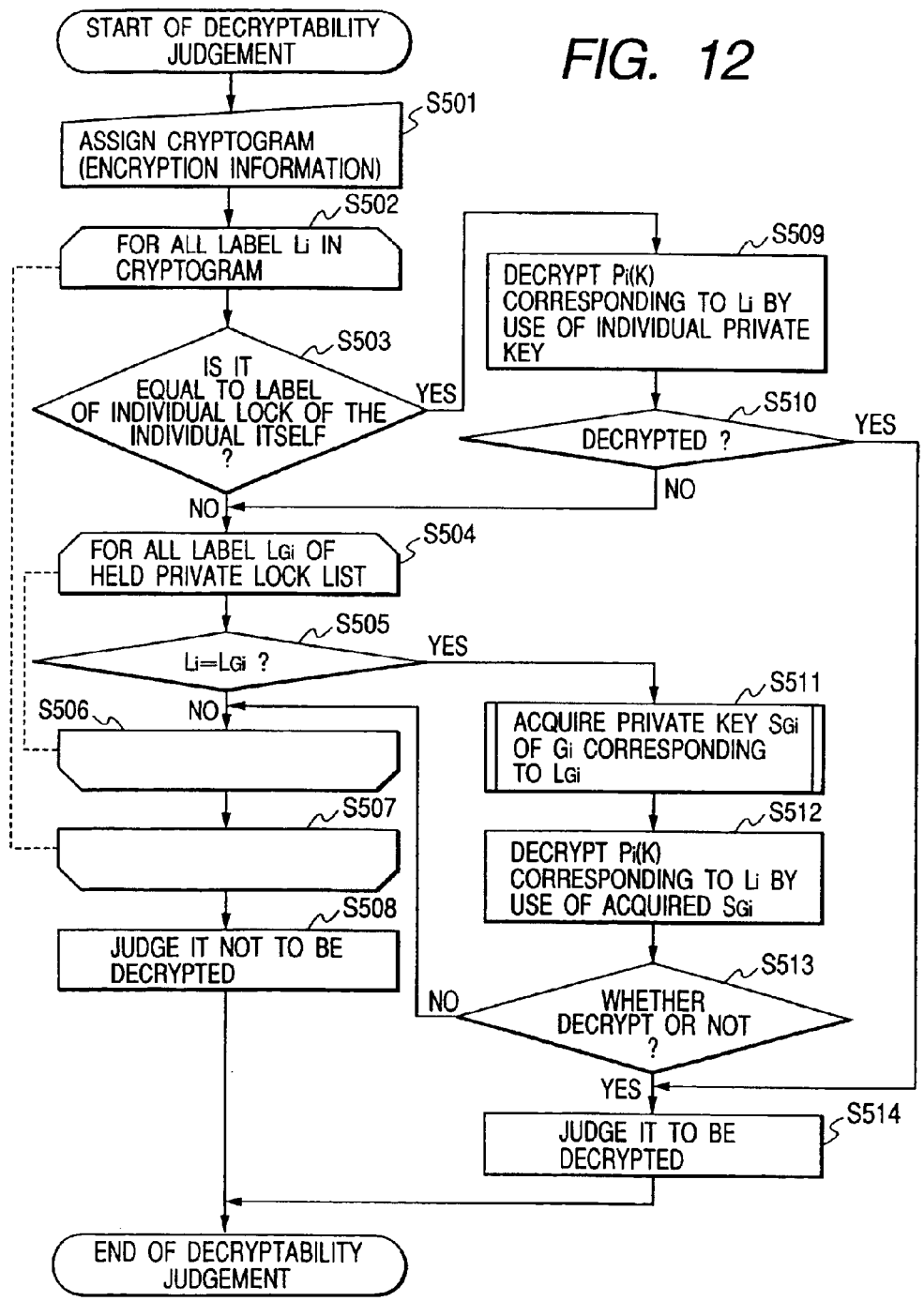
FIG. 12 is a flowchart for describing the decryptability judgement flow of the present invention.

A processing flow for judging whether an arbitrary cryptography can be decrypted by the subject itself or not, is shown in FIG. 12. For example, this flowchart is used to confirm which encrypted file can be decrypted by the subject itself when the encrypted files are listed. This flowchart is a process for executing the judgement of decryptability at high speed. In detail, based on the fact that decryption is impossible unless the label is coincident, first the coincidence of the label is confirmed and then decryption is tried only when the label is coincident. Generally, when the method for selecting the label is determined properly, this method provides sufficient performance. If the method for selecting the label cannot be specified, a method in which not only the label but also the public lock used for encryption is given to "cryptography" may be used for faster processing.

In the process, first the individual private key of the individual itself is tried to be used, and if decryption is impossible, then each group lock in the private lock list of the individual itself is tried to be used. Decryption described herein means decryption of only Pi (K) corresponding to the label Li in the "cryptography". It is not the purpose to obtain a plain document herein, K (D) is not decrypted.

The decryptability judgment flow shown in FIG. 12 is described in detail. In step 501, a cryptography the decryptability of which is to be judged is assigned. In steps 502 and 503, whether the label in the cryptography Li is coincident with the label of individual label of the individual itself is judged. If both labels are coincident each other, the sequence proceeds to step 509 to try decryption. If decryption is impossible in step 509 or if the coincident label cannot be found in steps 502 and 503, whether the label Li in the cryptography is coincident with the owned private lock label or not is judged. If the coincident label $L_{Gi}$ is found, then the sequence proceeds to step 511 to acquire the private key $S_{Gi}$ of Gi corresponding to the label $L_{Gi}$, and decryption is tried in steps 512 and 513. If the decryption is not successful, the sequence proceeds to steps 506 and 507, and the coincidence with the label of the private lock list owned by others and the coincidence with the label of the individual lock are tested. In step 506, the same processing as performed in step 504 is repeated for different labels, and in step 507, the same processing as performed in step 502 is repeated for different labels. If decryption is possible in step 510 or step 513, decryption in step 514 is judged to be possible.

[Acquisition of Private Key in Group Lock]

Figure 13:
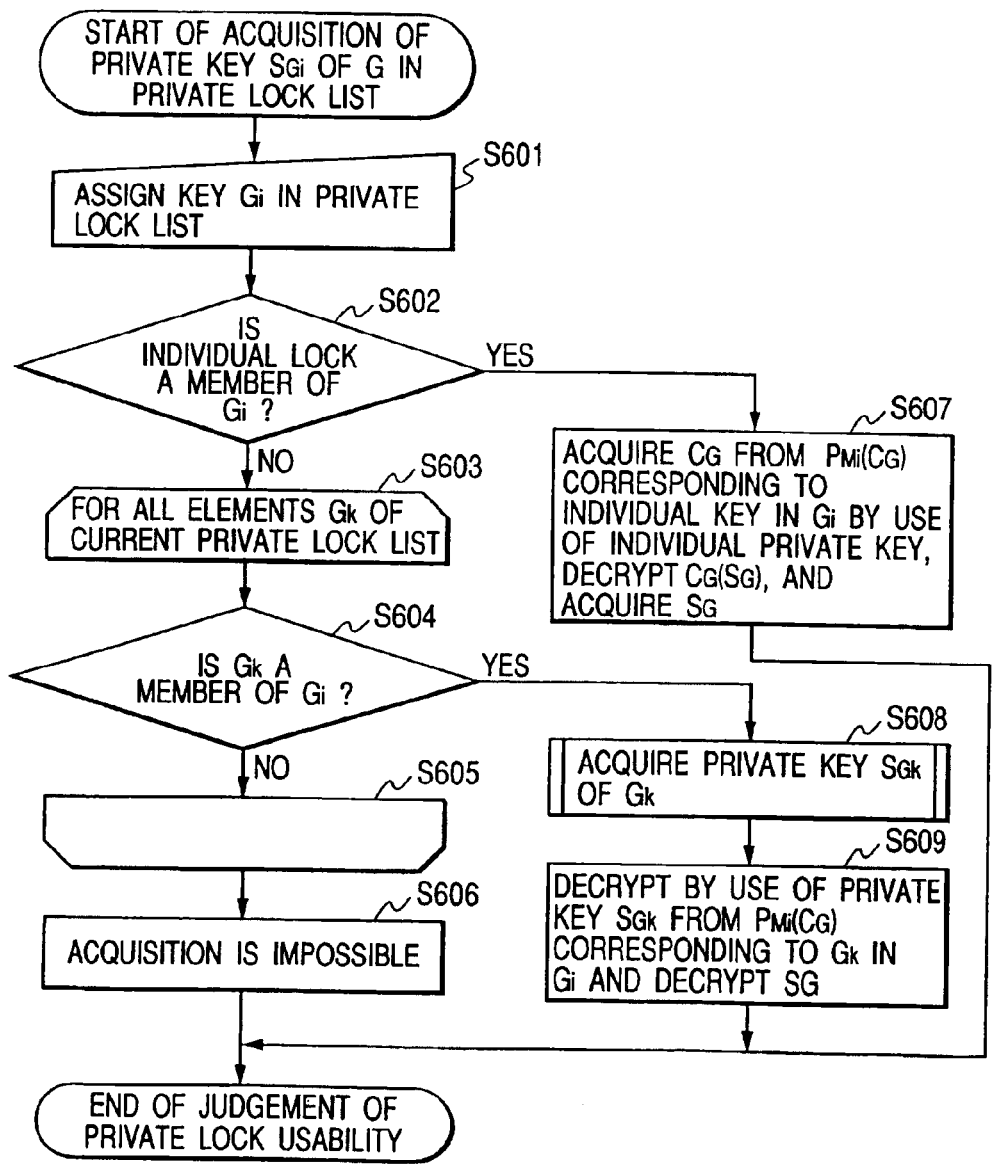
FIG. 13 is a flowchart for describing the flow for acquiring a private key in a private lock list of the present invention.

A flow for acquiring the private key $S_G$ of the group lock included in the private lock list is shown in FIG. 13. The private key of the group lock is used for decryption and signature.

It is apparent that the private key can be acquired because only the group lock from which the private key is acquired by directly or indirectly applying the private key of the individual is included in the private lock list.

In the process, first direct application of the individual private key of the individual itself is tried. If the trial is not successful, application of the group lock in the private lock list is tried. In the trial application of the group lock, this process is called recursively. A directed graph which is the inclusive relation between groups namely members formed as directed arc having the group as the node. Therefore, the private key is acquired in this process.

An acquisition flowchart of the private key $S_{Gi}$ shown in FIG. 13 is described in detail. First in step 601, a group lock Gi in the private lock list is assigned. In step 602, whether the individual lock of the individual itself is included in the member of the group lock Gi is tested, and if it is included, the sequence proceeds to step 607, then the common key $C_G$ is encrypted by use of the individual pubic key in the group lock Gi to extract the encrypted $P_{Mi}$ ($C_G$), and the extracted $P_{Mi}$ ($C_G$) is decrypted by use of the individual key to acquire the common key $C_G$. Further, $C_G$ ($S_G$) in the group lock is decrypted by use of the common key $C_G$ to acquire the group private key $S_G$.

If the individual lock of the individual itself is not included in the member of the group lock Gi in step 602, then in steps 603 to 605 whether Gk is a member of Gi is tested on all the elements Gk of the private lock list. This processing is performed to test whether each "the group lock Gk which the private lock can use" held by the subject itself is included as a member of the group lock Gi. If Gk which is a member of the group lock Gi is detected in step 604, then the private key $S_{GK}$ of Gk is acquired in step 608, the encrypted $P_{Mi}(S_G)$ in the group lock Gi is extracted in step 609, and the extracted $P_{Gi}(S_G)$ is decrypted by use of the private key $S_{GK}$ to acquire the group private key $S_G$.

[Decryption]

Figure 14:
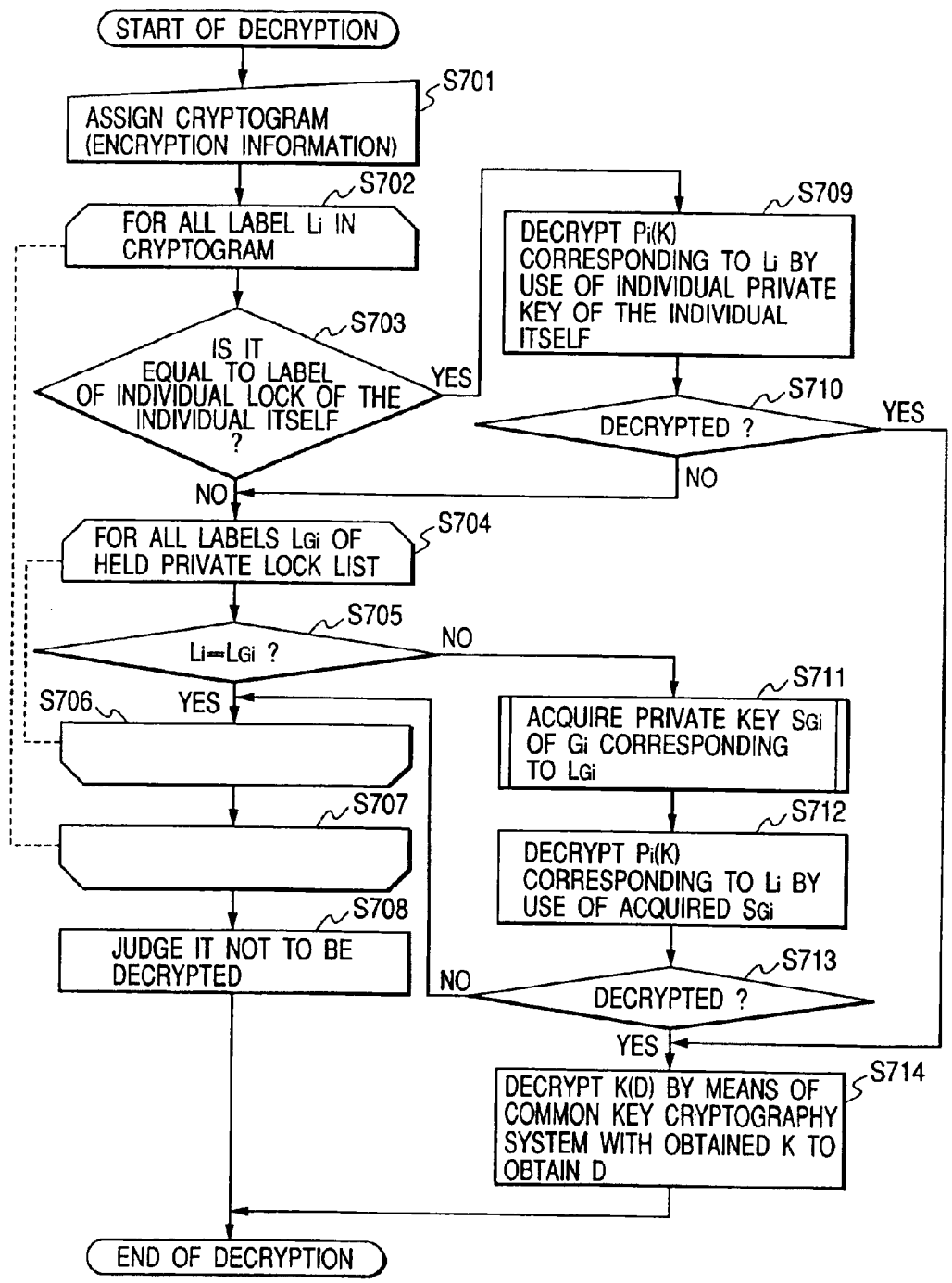
FIG. 14 is a flowchart for describing the decryption flow of the present invention.

A flow to decrypt an arbitrary cryptography is shown in FIG. 14. The flowchart shown in FIG. 14 is the almost same flow as shown for the above-mentioned "Decryptability judgment" processing. Steps 701 to 713 correspond to steps 501 to 513 in the decryptability judgment flowchart shown in FIG. 12. Only one exception is that K(D) is decrypted by use of the key K of the common key cryptography to acquire the plain document D. In the case that the cryptogram has a signature, the signature is validated as required, simultaneously when the plain document D is acquired.

[Signature Validation]

Figure 15:
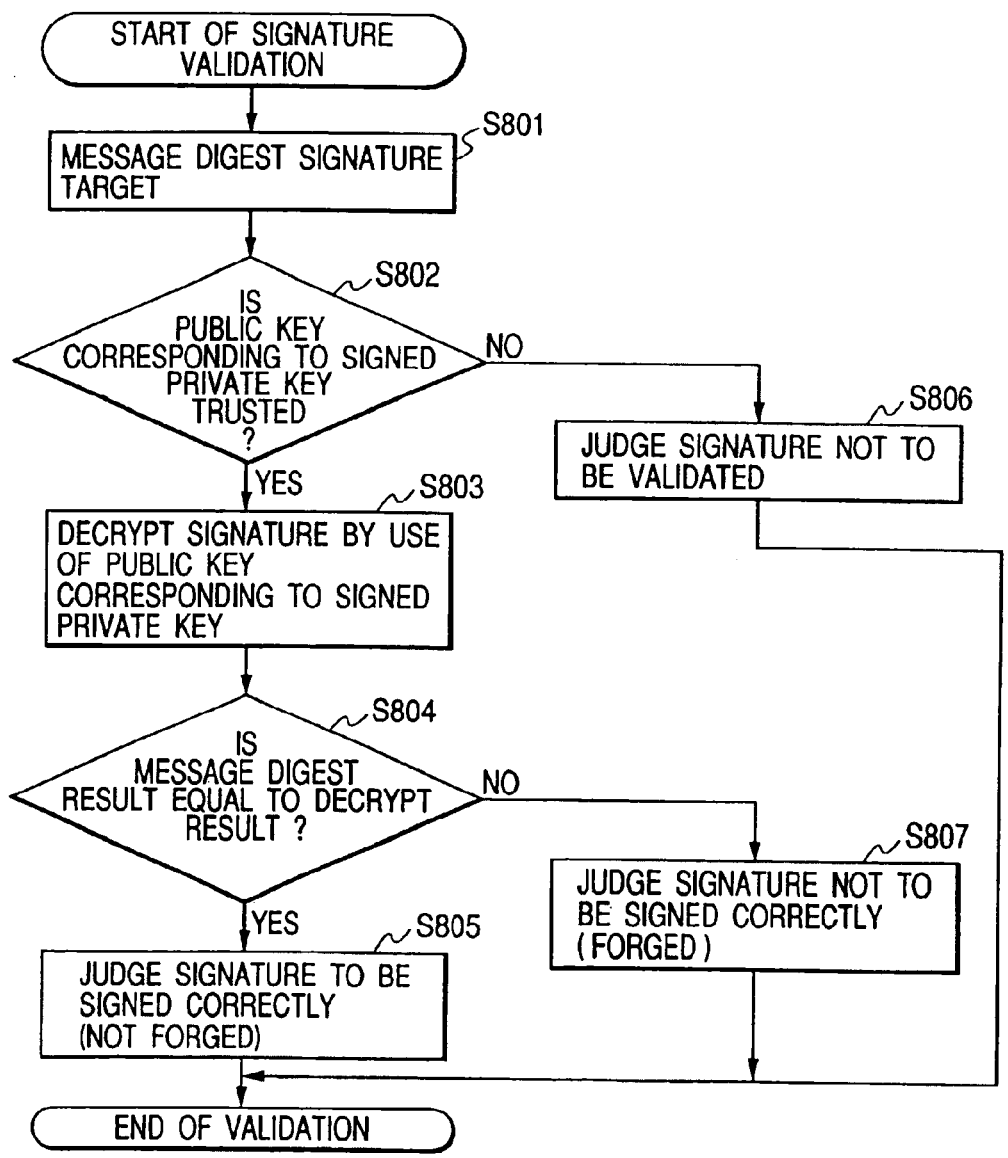
FIG. 15 is a flowchart for describing the signature confirming flow of the present invention.

A flowchart for validating a signature is shown in FIG. 15. The result obtained by processing in which the signature target is subjected to message digest processing is compared with the result obtained by decrypting the signature block (data added by signature processing) by use of the public key corresponding to the private key which is used for the signature. If two results are equal each other, it is validated that the signature is correct and the signature target is not forged.

Herein, the public key corresponding to the private key used for the signature should be trusted for correct validation. The condition that it is included in the public lock list of the subject itself should be satisfied for validation. The signature is not validated unless the public key is trusted.

If the result of message digest is not equal to the result of decryption, then it is clear that the signature target has been forged.

The signature validation flowchart shown in FIG. 15 is described. In step 801, the signature target is subjected to message digest. The message digest means a process for generating information consisting of 128 bits, which depends on the content of the target range, independently of the data size of the target range as described above, because encryption of the entire target range of the signature requires a high cost. Next, in step 802, whether the public key corresponding to the private key used for signature is trustable or not, is judged. If the public key is not trustable, then the signature validation is judged to be impossible in step 806.

If the public key is confirmed to be trustable in step 802, then the sequence proceeds to step 803, the signature block is decrypted by use of the public key corresponding to the private key which is used for the signature, and the coincidence with the message digest is judged in step 804. This process is the actual signature validation step. If the coincidence is denied in step 804, then the signature is judged to be not correct, that is, the private key used for the signature is judged to be not correct in step 807. If the message digest is judged to be equal to the decryption result in step 804, then the signature is concluded to be correct in step 805.

[Group Lock Change]

Figure 16:
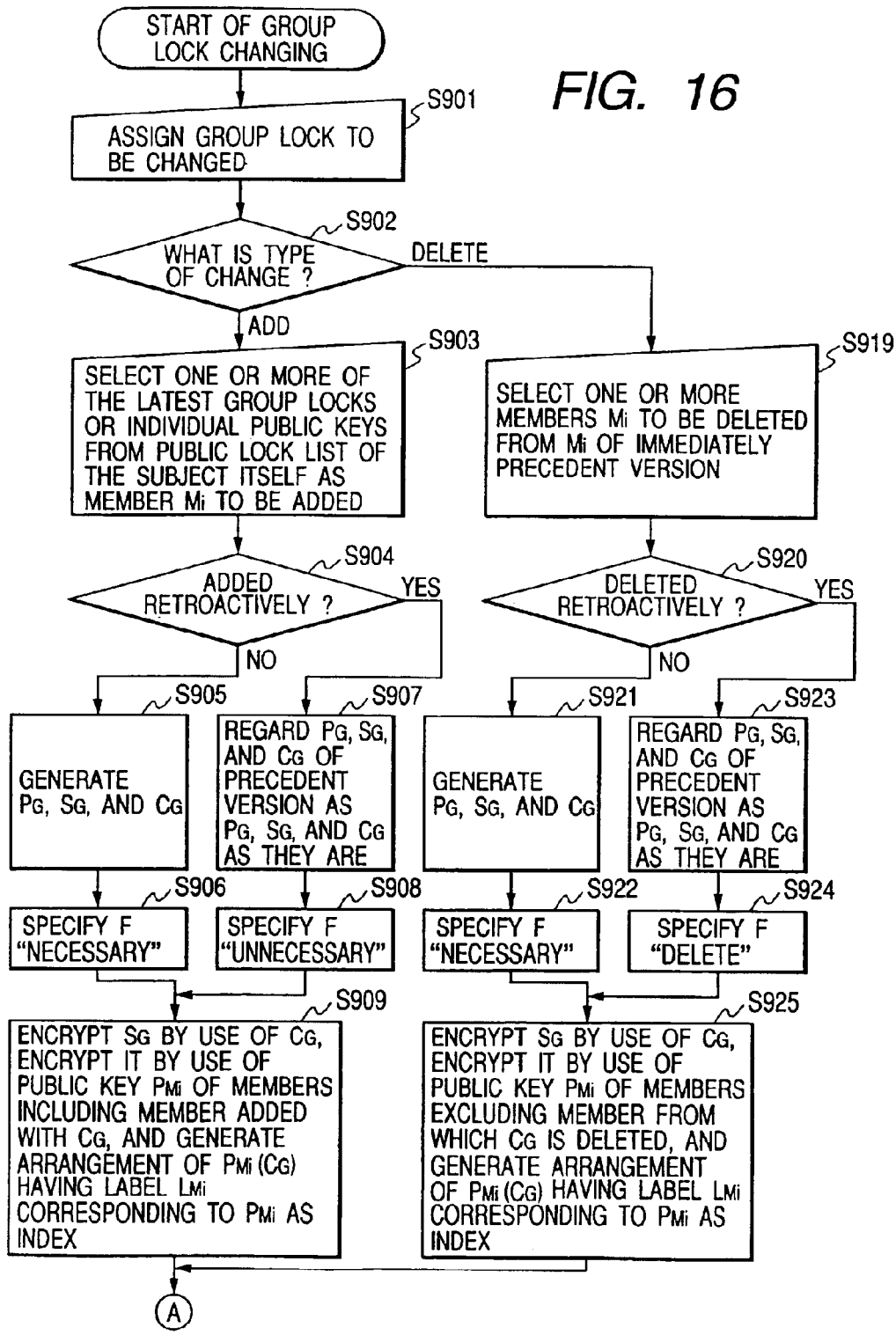
FIG. 16 is a flowchart (1) for describing the group lock changing flow of the present invention.

A flowchart for group lock change is shown in FIG. 16. Four types of group lock change are described below. In the flowchart, four types which are branched into four processing are described in the order from the left side.

A. Add Now.

A new member is added. The added new member cannot decrypt the cryptography which has been encrypted before the addition. In this case, a pair of a new private key and public key is assigned to $S_G$ and $P_G$ of the group lock of the new version. The F value is "necessary". Therefore, the individual who receives the new version will not delete the previous version. The reason is that it is necessary for previous members to decrypt the cryptography encrypted before the addition.

B. Add Retroactively.

A new member is added. The new member can also decrypt the cryptography encrypted before the addition. In this case, the previous $S_G$ and $P_G$ are used as they are. Therefore, F value is "unnecessary". The individual who receives the new version deletes the previous version. The new version may be used to decrypt the cryptography encrypted before the addition.

C. Delete Now.

An existing member is deleted. The deleted member can decrypt the cryptography encrypted before the deletion. Of course, the deleted member cannot decrypt the cryptography encrypted after the deletion. In this case, a pair of private key and the public key is assigned to $S_G$ and $P_G$ of the group lock of the new version. Further F value is "unnecessary". As the result, the individual who receives the new version does not delete the previous version. The reason is that it is necessary for previous members including the deleted member to decrypt the cryptography encrypted before the deletion.

D. Delete Retroactively.

An existing member is deleted retroactively. The deleted member cannot also decrypt the cryptography encrypted before the deletion. In this case, a pair of a new private key and public key is assigned to $S_G$ and $P_G$ of the group lock of the new version. Further, F value is "delete". As the result, the individual who receives the new version does not delete the previous version. The reason is that it is necessary for previous members, excluding the deleted member, to decrypt the cryptography encrypted before the deletion. However, in the case that the individual who receives, cannot acquire the private key of the new version, that is, the individual is the deleted member, the previous version is deleted. The reason is that the previous version is deleted so that the deleted member cannot also decrypt the cryptography encrypted before the deletion. The deletion of the group lock of the previous version by the deleted member is not guaranteed mathematically, but the deletion is promoted as a system in character.

When the group lock is changed, not only F value becomes meaningful but also the changing private key of the previous version is used for signature. The reason is that the new version is rendered trustable automatically in the case that the previous version is trusted as described hereinbefore. When the group lock is changed, the new group lock should be distributed promptly to everyone who requires it.

Figure 17:
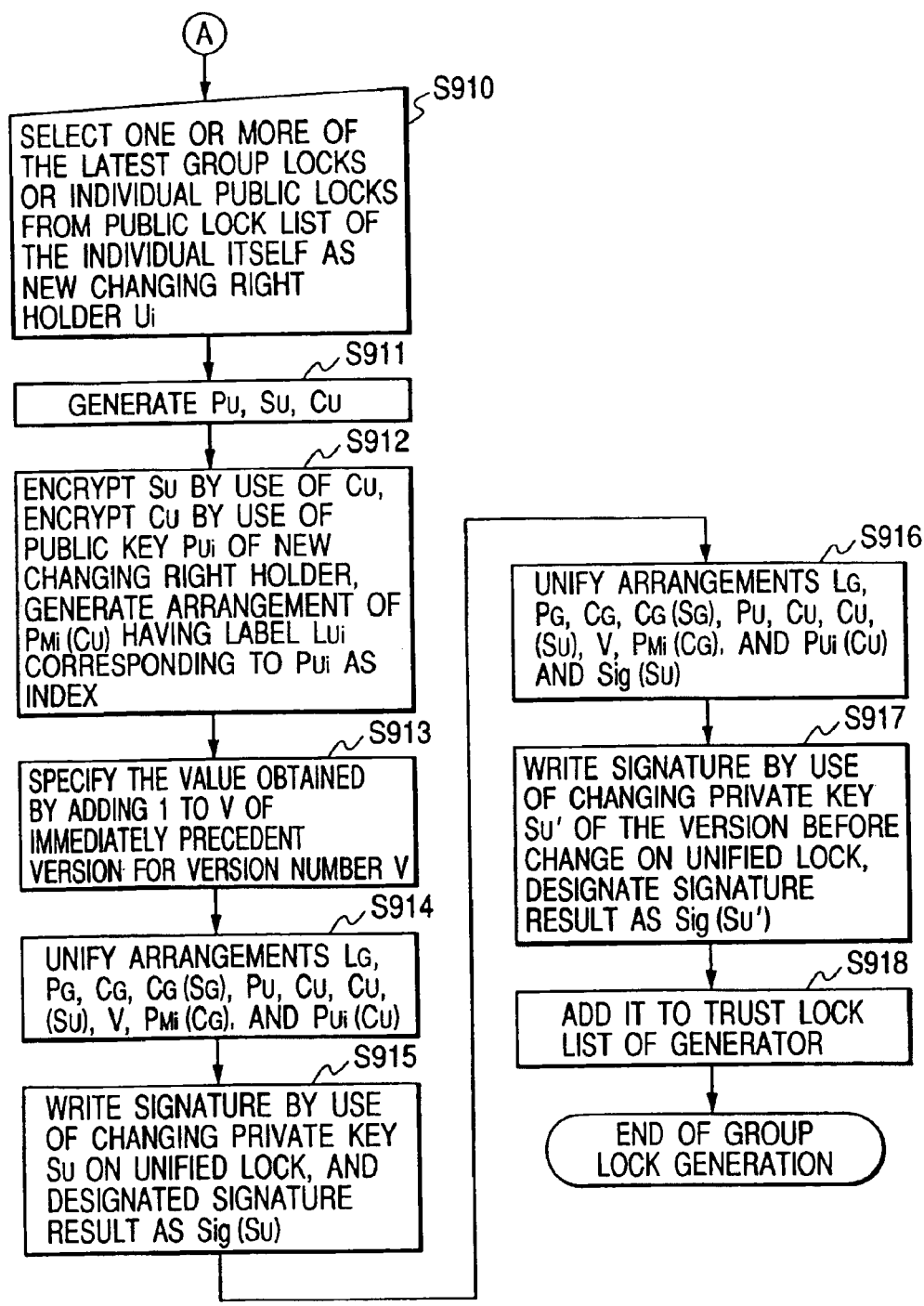
FIG. 17 is a flowchart (2) for describing the group lock changing flow of the present invention.

The group lock changing flowchart shown in FIG. 16 and FIG. 17 is described in detail. In steps 901 and 902, a group lock to be changed is assigned, and the type of change is discriminated. In step 902, any one of addition processing and deletion processing is selected, in the case that addition and deletion are both involved as in the case of exchanging of the member, the order is set for each member and processing is executed for members one by one.

In the case that the change involves addition of a member in step 902, the sequence proceeds to step 903, the public key of the group or individual corresponding to the member to be added is selected from the public lock list. Next, in step 904, whether the addition is the addition now or the addition retroactively is judged. In other words, whether decryption of the cryptographic information encrypted in the past is set so as to be possible or not, is determined. If the judgement in step 904 is NO, namely the addition from now, a group public key $P_G$, group private key $S_G$, and common key $C_G$ are generated in step 905, and "F" which indicates how to deal with the group lock of the immediately precedent version is set "necessary" in step 906. This indicates that the group lock of the new version and the group lock of the previous version coexist. On the other hand, if the judgement in step 904 is "add retroactively", the sequence proceeds to steps 907 and 908, $S_G$, $P_G$, and $C_G$ of the group lock which is under changing, are set as $S_G$, $P_G$, and $C_G$ of the changed group lock as they are, and F is set "unnecessary". This indicates that the group lock of the previous version is replaced completely with the group lock of the new version. Next, in step 909, the group private key $S_G$ is encrypted by use of the common key $C_U$ to generate $C_G$ ($S_G$), further $C_G$ is encrypted by use of the public key $P_{Mi}$ of the member including the added member to form an arrangement of $P_{Mi}$ ($C_G$) having the label LM corresponding to $P_{Mi}$ as an index.

Next, a new changing right holder is set in step 910, a pair of a private key and a public key of the changing key is generated in step 911, and the private key of the changing key is encrypted by use of the public key of the new changing right holder in step 912.

Further, the version number V is updated instep 913, respective data are unified in step 914, a signature is executed by use of the changing private key for the unified data in step 915 to generate the signature result Sig ($S_U$), and the data is further unified including the signature result in step 916. A signature is executed by use of the changing private key $S_U$' of the version before changing to generate Sig ($S_U$') in step 917, and the changed group lock is added to the trust lock list of the generator in step 918, thus the changing procedure of the group lock is brought to an end.

If the change involves the deletion of a member in step 902, the sequence proceeds to step 919, and a member to be deleted is selected. Next, in step 920, whether the deletion involves "from now" or "retroactively" is judged. In other words, whether the condition is set so that the cryptographic information encrypted in the past can be decrypted or not, is determined. If the judgement in step 920 is "NO", namely deletion from now, a group public key $P_G$, group private key $S_G$, and common key $C_G$ are generated in step 921, and "F" for indicating how to deal with the group lock of the immediately precedent version is set to "necessary" in step 922. This indicates that the new group lock of the new version and the group lock of the previous version coexist. On the other hand, if the judgement in step 920 is "delete retroactively", then the sequence proceeds to steps 923 and 924, $S_G$, $P_G$, and $C_G$ of the group lock which are now under changing are set as $S_G$, $P_G$, and $C_G$ of the changed group lock as they are, and F is set "delete". Next, in step 925, the common key $C_G$ is encrypted by use of the group private key $S_G$, further the common key $C_G$ is encrypted by use of the public key $P_{Mi}$ of the member who deletes the deleted member, and an arrangement of $P_{Mi}$ ($C_G$) having the label $L_{Mi}$ corresponding to $P_{Mi}$ as an index is formed. The procedure in step 910 and following steps is the same processing as performed in the case of addition.

APPLICATION EXAMPLE

FIG. 18 shows an application example to which the cryptography system described in the example is applied. In FIG. 18, a plurality of clients 20, a file server 30, and a directory server 40 are connected to a network 10. The network 10 may be LAN or WAN. The file server 30 stores files such as documents. The directory server 40 stores the group key. In this structure, for example, it is assumed that the client 20a stores a document in the file server 30. The client 20a extracts a desired group lock from the directory server 40, encrypts the document by use of the public key included in the extracted group lock, and stores the encrypted document 50a in the file server 30. When the client 20b wants to use the document, the client 20b extracts the document 50a from the file server 30 and extracts a desired group lock from the directory server 40 to acquire a private key, and decrypts the above-mentioned document by use of this private key.

In this structure, in the case that the client 20a writes a signature on the document and stores the document 50b with a signature in the file server 30, the client 20a extracts a desired group lock from the directory server 40 to acquire a private key of the group lock, and writes a signature by use of the private key. The client 20b can verify the signature of the document by use of the public key of the group lock.

In FIG. 18, the document of the file server 30 is the target to be processed by use of a group lock, but in the case that a mail server is used instead of the file server 30, the same encryption and decryption processing, and signature and verification processing are performed.

In the example of the present invention described hereinbefore, for example, the generation or change of decrypting lock, may be executed in an encrypting apparatus, a decrypting apparatus, or other apparatus in the third station, and that is true for other structural elements used in this public key cryptography system such as various lock lists.

In the present example, the target to be encrypted by use of a private key of a group/member is a common key consisting of a small number of bits (for example, 48 to 120 bits) and an amount of encryption processing is small, therefore a group lock is generated promptly at a reduced cost even though the number of members is large. Further, the private key of the group lock appears only once in the cryptogram encrypted by use of the common key, therefore this system is preferable for maintaining the confidentiality.

In the present example, the private key of the group lock is encrypted by use of the common key, therefore a cryptogram is decrypted at a low cost in comparison with the case of encryption by use of the public key. The private keys $S_G$ and $S_U$ are not directly encrypted by use of the common keys $C_G$ and $C_U$ but modified private keys ($S_G$', $S_U$') may be encrypted by use of $C_G$ and $C_U$. The relation between the modified private key and the original private key is specified as described herein under.

[Expression 4]

$$S_G'=f_G(S_G)$$

$$S_U'=f_U(S_U)$$

wherein functions $F_G$ and $F_U$ are not one directional function. Therefore, the functions $F_G$ and $F_U$ include inverse functions $f_G^{-1}$ and $f_U^{-1}$ represented by the following equations.

[Expression 5]

$$S_G=f_G^{-1}(S_G')$$

$$S_U=f_U^{-1}(S_U')$$

wherein modified functions $f_G$ and $f_U$ may be arbitrary functions as long as the inverse function exists and may be selected depending on the degree of required confidentiality.

The system structured as described herein above prevents an attacker from acquiring the private keys $S_G$ and $S_U$ even if the attacker decrypts the cryptograms $C_G(S_G')$ and $C_U(S_U')$ to acquire $S_G'$ and $S_U'$ because the attacker does not know the inverse function $f_G^{-1}$ and $f_U^{-1}$.

Instead of the process in which the common keys $C_G$ and $C_U$ are encrypted by use of the public key of the group/member to generate cryptograms $P_{Mi}(C_G)$ and $P_{Mi}(C_U)$, the process in which a plain document is added with a so-called seed to encrypt the document may be used. This is represented as described herein under.

[Expression 6]

$$P_{Mi}(C_G + f_P(P_{Mi}))$$

$$P_{mi}(C_u + f_P(P_{Mi}))$$

wherein $f_P$ is a function which generates some output when the public key used for encryption is entered, for example, a hash function such as MD 5 or SHA 1 (brand name) may be used. The public key is different for every member, therefore the encryption target is different for every member, as the result the safety is improved.

In the above-mentioned example, because the common key is encrypted by use of the public key of each member, a plurality of cryptograms of $C_G$ appears in the group lock. Even in this case, no hint is given to an attacker because of the seed.

In the above-mentioned example, the private key is encrypted by use of the common key and the common key is encrypted by use of the public key of the member. However, an encryption scheme in which the private key is directly encrypted by use of the public key of the member may be used. In such scheme, the above-mentioned seed may be used. In detail, the group key is structured so that the private keys $S_G$ and $S_U$ are included in $P_{Mi}(S_G)$ and $P_{Mi}(S_U)$ encrypted by use of the public key $P_{Mi}$ of the member (common keys $C_G$ and $C_U$ are not used). In this case, $P_{Mi}(S_G + f_P(P_{Mi}))$ and $P_{Mi}(S_U + f_P(P_{Mi}))$ with seed is included in the group lock instead of $P_{Mi}(S_G)$ and $P_{Mi}(S_U)$.

As described above, in the group type public key cryptography system of the present invention, the concept of group is introduced into the conventional public key cryptography system in which an individual is involved as a unit, the encryption processing of a plain document and the decryption processing of a cryptographic information by an arbitrary member who belongs to the group, can be executed by using the group public key and group private key which are generated with involving a group as a unit, and the combination of the individual public key and individual private key. According to the structure, it is possible for members of the group to hold cryptographic information in common based on the membership between the members in the group while the strict confidentiality is maintained between the inside of the group and the outside of the group. The proper encryption processing and validation of the proper encryption by the member in the group are possible by use of the electronic signature by the member who belongs to the group.

Further, in the group type public key cryptography system of the present invention, when a group lock is changed correspondingly to the change of a member who is a component of the group, a new pair of group public key and group private key is generated and registered at the time point when a member is changed, and the group lock can be changed easily correspondingly to the member change in structure. A signature written when the group lock is changed covers the entire arrangement of elements which constitute the group lock to thereby ensure the guarantee of the change.

Because the common key consisting of relatively small amount of data is encrypted by use of a cryptographic key to generate a group lock, the load for generating a group lock is small. The private key itself of the group lock which is encrypted by use of the common key appears only once in the group lock, no hint is given to an attacker.

What is claimed is:

1. A method for encryption comprising:

storing lock data which includes a group public key, an encrypted private key formed by encrypting a group private key that corresponds to said group public key, by use of a common key, and a plurality of encrypted common keys generated by encrypting said common key by use of respective public keys of group members; and encrypting encryption target data by use of the group public key of said lock data.

2. The method for encryption as claimed in claim 1, wherein said encryption target data is a decrypting key used for decrypting encrypted information.

3. A method for decrypting a cryptogram comprising:

storing lock data which includes a group public key, an encrypted private key formed by encrypting a group private key that corresponds to said group public key, by use of a common key, and a plurality of encrypted common keys generated by encrypting said common key by use of respective public keys of group members;

decrypting one of said encrypted common keys included in said lock data by use of a private key corresponding to a group member;

decrypting said encrypted private key included in said lock data by use of said decrypted common key used to generate said encrypted private key;

acquiring encryption target data encrypted by use of said group public key; and decrypting said encrypted encryption target data by use of said decrypted group private key.

4. A method for writing a signature comprising:

storing lock data which includes a group public key, an encrypted private key, the encrypted private key being formed by encrypting a group private key that corresponds to said public key, by use of a common key, and a plurality of encrypted common keys generated by encrypting said common key by use of respective public keys of group members;

decrypting one of said encrypted common keys included in said lock data by use of a private key corresponding to a group member;

decrypting said encrypted private key included in said lock data by use of said decrypted common key;

acquiring and storing signature target data on which a signature to be verified by use of said group public key is to be written; and writing a signature on said signature target data by use of said decrypted group private key.

5. A method for generating lock data comprising:

acquiring a pair of a group public key and a group private key;

acquiring a common key;

encrypting said group private key by use of said common key to generate an encrypted private key;

encrypting said common key by use of public keys of respective group members to generate corresponding encrypted common keys; and combining said public keys, said encrypted private key, and said encrypted common keys to generate lock data.

6. A method for generating lock data comprising:

acquiring a pair of a group public key and a group private key;

acquiring a common key;

modifying said group private key by use of a desired function including an inverse function to generate a modified group private key;

encrypting said modified group private key by use of said common key to generate an encrypted modified private key;

encrypting said common key by use of public keys of respective group members to generate corresponding encrypted common keys; and combining said public keys, said encrypted modified private key, and said encrypted common keys to generate lock data.

7. The method for generating lock data as claimed in claim 5, wherein said lock data further includes a public key for verifying a signature, an encrypted signature private key which is formed by encrypting a signature private key for writing said signature by use of a public key of a changing right holder, and a signature written by use of said signature private key on desired data included in said lock data.

8. A method for changing lock data comprising:

storing lock data including a first public key, an encrypted private key formed by encrypting a private key corresponding to said first public key by use of a common key, a plurality of encrypted common keys formed by encrypting said common key by use of public keys of respective group members, a second public key for verifying a signature, and an encrypted signature private key formed by encrypting a signature private key for writing said signature by use of a public key of a changing right holder, said first public key, decrypting said encrypted signature private key included in said lock data by use of said private key of a changing right holder;

changing said lock data; and writing a signature on the changed lock data by use of said signature private key.

9. The method for changing lock data as claimed in claim 8, wherein said step for changing said lock data includes:

changing said second public key;

changing said signature private key;

changing said encrypted signature private key before changing by use of a new encrypted signature private key newly formed by encrypting a changed signature private key by use of said public key of a changing right holder; and writing a signature by use of said signature private key after changing.

10. The method for changing lock data as claimed in claim 8, wherein said lock data has a version identifier that indicates the version of said lock data.

11. The method for changing lock data as claimed in claim 8, wherein said lock data has a precedent version dealing identifier, and controls how to deal with the lock data of the precedent version based on the identifier.

12. The method for changing lock data as claimed in claim 11, wherein said precedent version dealing identifier includes the information that identifies whether the change of said lock data should be applied retroactively or not.

13. An apparatus for encryption comprising:

a memory part that stores a group public key, an encrypted private key formed by encrypting a group private key corresponding to said group public key, by use of a common key, and a plurality of encrypted common keys formed by encrypting said common key by use of public keys of respective group members; and an encryption part that encrypts encryption target data by use of a public key of a lock data.

14. An apparatus for decrypting a cryptogram comprising:

a memory part that stores a group public key, an encrypted private key formed by encrypting a group private key corresponding to said group public key by use of a common key, and a plurality of encrypted common keys formed by encrypting said common key by use of public keys of respective group members;

a generation part that decrypts one of said encrypted common keys by use of a private key corresponding to a group member;

a generation part that decrypts said encrypted private key included in a lock data by use of said decrypted common key;

an acquiring part that acquires encryption target data encrypted by use of said public key; and a decrypting part that decrypts said encrypted encryption target data by use of said decrypted group private key.

15. An apparatus for decrypting a cryptogram comprising:

a memory part that stores a group public key, an encrypted private key formed by encrypting a group private key corresponding to said group public key, by use of a common key, and a plurality of encrypted common keys formed by encrypting said common key by use of public keys of respective group members;

a generation part that decrypts one of said encrypted common keys by use of a private key corresponding to a group member;

a generation part that decrypts said encrypted private key included in a lock data by use of said decrypted common key;

a memory part that stores and acquires signature target data on which a signature to be verified by use of said public key is to be written; and a signature part that writes a signature on said signature target data by use of said decrypted group private key.

16. An apparatus for generating lock data comprising:

an acquiring part that acquires a pair of a group public key and a group private key;

an acquiring part that acquires a common key;

a generation part that encrypts said group private key by use of said common key to generate an encrypted private key;

a generation part that encrypts said common key by use of public keys of respective group members to generate an encrypted common key; and a generation part that combines said group public key, said encrypted private key, and said encrypted common key to generate lock data.

17. An apparatus for changing lock data comprising:

a memory part that stores lock data including a first public key, an encrypted private key formed by encrypting a private key corresponding to said first public key by use of a common key, a plurality of encrypted common keys formed by encrypting said common key by use of public keys of respective group members, a second public key for verifying a signature, and an encrypted signature private key formed by encrypting a signature private key for writing said signature by use of a public key of a changing right holder, said first public key;

a generation part that decrypts said encrypted signature private key included in said lock data by use of said private key of a changing right holder to generate a signature private key;

a changing part that changes said lock data; and a signature part that writes a signature on the changed lock data by use of said signature private key.

* * * * *